United States Patent [19] [11] Patent Number: 4,996,089
Saito et al. [45] Date of Patent: Feb. 26, 1991

[54] OPTICAL DATA RECORDING MEDIUM

[75] Inventors: Osamu Saito, Takatsuki; Hisamitsu Kamezaki; Masashi Suenaga, both of Ibaraki; Ryo Nagai, Hirakata; Shinichiro Iuchi, Ibaraki; Hitoshi Watanabe, Ibaraki; Hideo Fujiwara, Ibaraki, all of Japan

[73] Assignee: Hitachi Maxell, Ltd., Osaka, Japan

[21] Appl. No.: 380,295

[22] Filed: Jul. 17, 1989

[30] Foreign Application Priority Data

Jul. 18, 1988 [JP] Japan .................. 63-177138
Jul. 23, 1988 [JP] Japan .................. 63-182793
Mar. 23, 1989 [JP] Japan .................. 1-69265

[51] Int. Cl.⁵ ............................... B32B 3/00
[52] U.S. Cl. ........................ 428/64; 428/65;
    428/913; 430/270; 430/945; 369/288; 346/1.1;
    346/76 L; 346/135.1
[58] Field of Search ............ 430/270, 945; 428/64,
    428/65, 913; 369/288; 346/1.1, 76 L, 135.1

[56] References Cited

U.S. PATENT DOCUMENTS 4,547,444 10/1985 Bell et al. .................. 430/11
4,735,839 4/1988 Sato et al. .................. 428/64
4,767,693 8/1988 Oba et al. .................. 430/270
4,791,023 12/1988 Suzuki et al. .................. 428/411.1
4,885,228 12/1989 Inagi et al. .................. 430/270
4,900,648 2/1990 Hioki .................. 430/270

FOREIGN PATENT DOCUMENTS 0039094 11/1981 European Pat. Off. .
0042307 12/1981 European Pat. Off. .
0181941 5/1986 European Pat. Off. .
61-277492 12/1986 Japan .
0264274 4/1988 European Pat. Off. .
0304050 2/1989 European Pat. Off. .
3622256 1/1987 Fed. Rep. of Germany .

Primary Examiner—Patrick J. Ryan
Attorney, Agent, or Firm—Birch, Stewart, Kolasch & Birch

[57] ABSTRACT

An optical data recording medium provided with a recording layer, the recording medium having excellent durability to light and heat, superior writing sensitivity and a high C/N value, wherein at least one a group of anion selected from a group of hexafluorophosphate ion ($PF_6^-$), trifluoromethane sulfonate ion ($CF_3SO_3^-$) or thiocyanate ion ($SCN^-$) is present as the anion in an indol cyanine dye having a methyne chain present in the recording layer of the optical data recording medium.

16 Claims, 25 Drawing Sheets

F I G. 5

FIG. 6
| (I) |  | (VIII) | 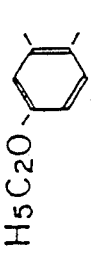 | (XV) |  |
| (II) | 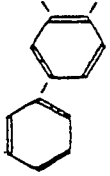 | (IX) |  | (XVI) |  |
| (III) |  | (X) |  | (XVII) |  |
| (IV) |  | (XI) | 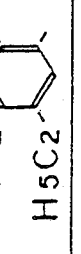 | (XVIII) |  |
| (V) | 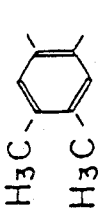 | (XII) |  | | |
| (VI) |  | (XIII) |  | | |
| (VII) |  | (XIV) | 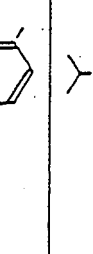 | | |

FIG. 7

COMPOUND NO.

| | R | R(1) | --A-- | ---B--- | -(T)= | X |
|---|---|---|---|---|---|---|
| 1 | CH3 | CH3 | I | H3C\C/CH3 | II | PF6 |
| 2 | CH3 | CH3 | IV | H3C\C/CH3 | II | PF6 |
| 3 | CH3 | CH3 | V | H3C\C/CH3 | II | PF6 |
| 4 | CH3 | CH3 | XII | H3C\C/CH3 | I | PF6 |
| 5 | CH3 | CH3 | XVI | H3C\C/CH3 | I | PF6 |
| 6 | C2H5 | C2H5 | I | H3C\C/CH3 | I | PF6 |
| 7 | C2H5 | C2H5 | I | H3C\C/CH3 | III | PF6 |
| 8 | C2H5 | C2H5 | IV | H3C\C/CH3 | III | PF6 |
| 9 | C2H5 | C2H5 | XVI | H3C\C/CH3 | VII | PF6 |
| 10 | C3H7 | C3H7 | I | H3C\C/CH3 | I | PF6 |
| 11 | C3H7 | C3H7 | I | -CH=CH- | X | PF6 |
| 12 | C3H7 | C3H7 | X | -S- | IV | PF6 |
| 13 | (CH2)3SO3H | (CH2)3SO3H | I | H3C\C/CH3 | I | PF6 |
| 14 | (CH2)2COOH | (CH2)2COOH | I | H3C\C/CH3 | I | PF6 |
| 15 | (CH2)2OCH3 | (CH2)2OCH3 | I | H3C\C/CH3 | I | PF6 |

FIG. 8

| COMPOUND NO. | R | R(1) | --A-- | ---B--- | -(T)= | X |
|---|---|---|---|---|---|---|
| 16 | CH₃ | C₂H₅ | I | H₃C\C/CH₃ | I | PF₆ |
| 17 | CH₃ | C₃H₇ | I | H₃C\C/CH₃ | I | PF₆ |
| 18 | CH₃ | C₄H₉ | I | H₃C\C/CH₃ | I | PF₆ |
| 19 | CH₃ | C₅H₁₁ | I | H₃C\C/CH₃ | I | PF₆ |
| 20 | CH₃ | C₈H₁₇ | I | H₃C\C/CH₃ | I | PF₆ |
| 21 | CH₃ | C₁₄H₂₉ | I | H₃C\C/CH₃ | I | PF₆ |
| 22 | CH₃ | C₁₈H₃₇ | I | H₃C\C/CH₃ | I | PF₆ |
| 23 | C₂H₅ | C₃H₇ | I | H₃C\C/CH₃ | I | PF₆ |
| 24 | C₂H₅ | C₅H₁₁ | I | H₃C\C/CH₃ | I | PF₆ |
| 25 | C₂H₅ | C₈H₁₇ | I | H₃C\C/CH₃ | I | PF₆ |
| 26 | C₂H₅ | C₁₄H₂₉ | I | H₃C\C/CH₃ | I | PF₆ |
| 27 | C₃H₇ | C₅H₁₁ | XVI | H₃C\C/CH₃ | I | PF₆ |
| 28 | C₃H₇ | C₈H₁₇ | XVI | H₃C\C/CH₃ | I | PF₆ |
| 29 | C₃H₇ | C₁₄H₂₉ | XVI | H₃C\C/CH₃ | I | PF₆ |

FIG. 9

| COMPOUND NO. | R | R$^{(1)}$ | ··A·· | ···B··· | -①= | X |
|---|---|---|---|---|---|---|
| 66 | CH$_3$ | C$_3$H$_7$ | I | H$_3$C\_C\_CH$_3$ | I | I |
| 67 | C$_2$H$_5$ | C$_5$H$_7$ | I | H$_3$C\_C\_CH$_3$ | I | I |
| 68 | CH$_3$ | C$_3$H$_7$ | I | H$_3$C\_C\_CH$_3$ | I | ClO$_4$ |
| 69 | C$_2$H$_5$ | C$_5$H$_7$ | I | H$_3$C\_C\_CH$_3$ | I | ClO$_4$ |
| 70 | C$_3$H$_7$ | C$_3$H$_7$ | I | H$_3$C\_C\_CH$_3$ | II | I |
| 71 | C$_3$H$_7$ | C$_3$H$_7$ | I | H$_3$C\_C\_CH$_3$ | II | ClO$_4$ |

FIG. 10

| NO. (COMPOUND) | FILM THICKNESS (nm) | C/N (dB) | REMAINING LIGHT ABSORBING RATIO (%) | NUMBER OF READING TIMES |
|---|---|---|---|---|
| 1 | 58 | 51 | 85 | $0.9 \times 10^5$ |
| 2 | 56 | 51 | 83 | $0.8 \times 10^5$ |
| 3 | 57 | 52 | 86 | $0.9 \times 10^5$ |
| 4 | 60 | 50 | 81 | $0.7 \times 10^5$ |
| 5 | 55 | 49 | 85 | $1.1 \times 10^5$ |
| 6 | 57 | 51 | 84 | $1.0 \times 10^5$ |
| 7 | 56 | 53 | 91 | $2.3 \times 10^5$ |
| 8 | 58 | 52 | 89 | $1.9 \times 10^5$ |
| 9 | 61 | 50 | 83 | $2.1 \times 10^5$ |
| 10 | 55 | 53 | 86 | $1.1 \times 10^5$ |
| 11 | 57 | 51 | 85 | $1.7 \times 10^5$ |
| 12 | 54 | 51 | 84 | $0.5 \times 10^5$ |
| 13 | 59 | 49 | 79 | $0.6 \times 10^5$ |
| 14 | 56 | 50 | 80 | $0.7 \times 10^5$ |
| 15 | 60 | 50 | 81 | $0.6 \times 10^5$ |

FIG. 11

| COMPOUND NO. | FILM THICKNESS (nm) | C/N (dB) | REMAINING LIGHT ABSORBING RATIO (%) | NUMBER OF READING TIMES |
|---|---|---|---|---|
| 16 | 56 | 52 | 87 | $1.1 \times 10^5$ |
| 17 | 55 | 50 | 85 | $1.1 \times 10^5$ |
| 18 | 58 | 51 | 83 | $1.0 \times 10^5$ |
| 19 | 57 | 51 | 81 | $0.9 \times 10^5$ |
| 20 | 56 | 50 | 81 | $0.8 \times 10^5$ |
| 21 | 57 | 50 | 80 | $0.7 \times 10^5$ |
| 22 | 55 | 49 | 79 | $0.7 \times 10^5$ |
| 23 | 58 | 51 | 90 | $1.0 \times 10^5$ |
| 24 | 56 | 50 | 91 | $0.9 \times 10^5$ |
| 25 | 57 | 52 | 88 | $0.7 \times 10^5$ |
| 26 | 59 | 52 | 84 | $0.7 \times 10^5$ |
| 27 | 59 | 52 | 87 | $1.0 \times 10^5$ |
| 28 | 57 | 51 | 85 | $0.9 \times 10^5$ |
| 29 | 56 | 51 | 80 | $0.8 \times 10^5$ |

FIG. 12

| COMPOUND NO. | FILM THICK-NESS (nm) | C/N (dB) | REMAINING LIGHT ABSORBING RATIO (%) | NUMBER OF READING TIMES |
|---|---|---|---|---|
| 66 | 58 | 45 | 62 | $1.3 \times 10^3$ |
| 67 | 56 | 44 | 61 | $1.1 \times 10^3$ |
| 68 | 56 | 44 | 67 | $1.1 \times 10^4$ |
| 69 | 57 | 45 | 66 | $1.0 \times 10^4$ |
| 70 | 60 | 46 | 63 | $3.6 \times 10^3$ |
| 71 | 58 | 45 | 74 | $1.2 \times 10^4$ |

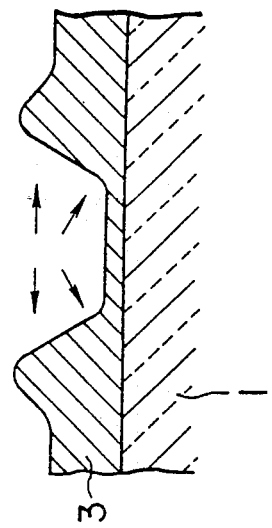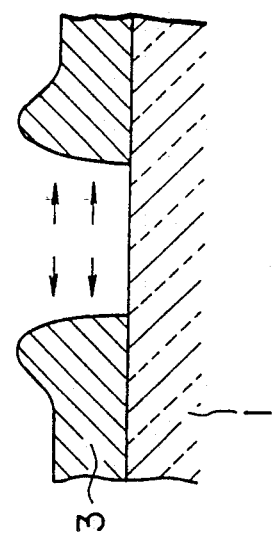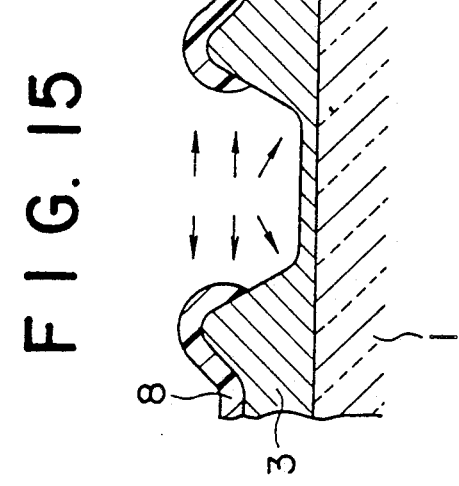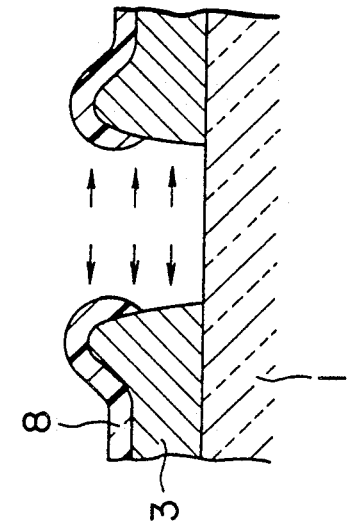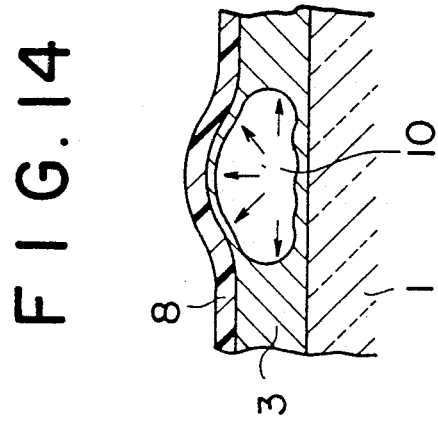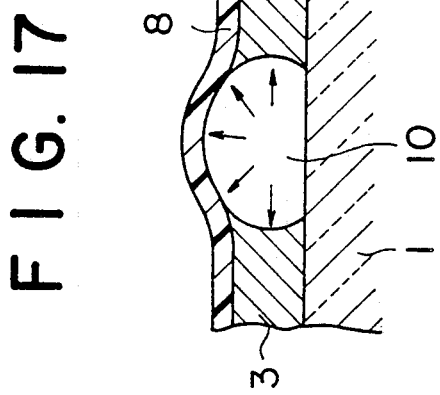

INCIDENT LIGHT
(VERTICAL INCIDENCE
IN PRACTICE)

F I G. 29
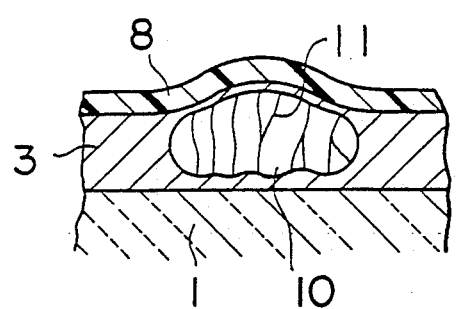
F I G. 43
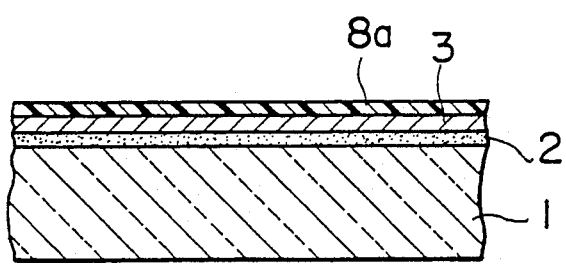

FIG. 44

| COMPOUND NO. | R | R⁽¹⁾ | —A— | —B— | =(T)= | X |
|---|---|---|---|---|---|---|
| 30 | $CH_3$ | $CH_3$ | I | $H_3C\underset{C}{\diagdown}CH_3$ | II | $CF_3SO_3$ |
| 31 | $CH_3$ | $CH_3$ | IV | $H_3C\underset{C}{\diagdown}CH_3$ | II | $CF_3SO_3$ |
| 32 | $C_2H_5$ | $C_2H_5$ | I | $H_3C\underset{C}{\diagdown}CH_3$ | I | $CF_3SO_3$ |
| 33 | $C_2H_5$ | $C_2H_5$ | IV | $H_3C\underset{C}{\diagdown}CH_3$ | I | $CF_3SO_3$ |
| 34 | $C_2H_5$ | $C_2H_5$ | XVI | $H_3C\underset{C}{\diagdown}CH_3$ | III | $CF_3SO_3$ |
| 35 | $C_3H_7$ | $C_3H_7$ | I | $H_3C\underset{C}{\diagdown}CH_3$ | I | $CF_3SO_3$ |
| 36 | $C_3H_7$ | $C_3H_7$ | IV | $H_3C\underset{C}{\diagdown}CH_3$ | I | $CF_3SO_3$ |
| 37 | $C_3H_7$ | $C_3H_7$ | XVI | $H_3C\underset{C}{\diagdown}CH_3$ | III | $CF_3SO_3$ |
| 38 | $C_5H_{11}$ | $C_5H_{11}$ | I | $H_3C\underset{C}{\diagdown}CH_3$ | I | $CF_3SO_3$ |
| 39 | $C_5H_{11}$ | $C_5H_{11}$ | IV | $H_3C\underset{C}{\diagdown}CH_3$ | I | $CF_3SO_3$ |
| 40 | $C_5H_{11}$ | $C_5H_{11}$ | XVI | $H_3C\underset{C}{\diagdown}CH_3$ | III | $CF_3SO_3$ |
| 41 | $C_8H_{17}$ | $C_8H_{17}$ | I | $H_3C\underset{C}{\diagdown}CH_3$ | I | $CF_3SO_3$ |
| 42 | $C_8H_{17}$ | $C_8H_{17}$ | IV | $H_3C\underset{C}{\diagdown}CH_3$ | I | $CF_3SO_3$ |
| 43 | $C_8H_{17}$ | $C_8H_{17}$ | XVI | $H_3C\underset{C}{\diagdown}CH_3$ | III | $CF_3SO_3$ |
| 44 | $C_5H_{11}$ | $C_5H_{11}$ | I | $-CH=CH-$ | I | $CF_3SO_3$ |

FIG. 45

| COMPOUND NO. | R | R(1) | —A— | —B— | —T— | X |
|---|---|---|---|---|---|---|
| 45 | C5H11 | C5H11 | X | —S— | IV | CF3SO3 |
| 46 | (CH2)3SO3H | (CH2)3SO3H | I | H3C\C/CH3 | I | CF3SO3 |
| 47 | (CH2)2COOH | (CH2)2COOH | I | H3C\C/CH3 | I | CF3SO3 |
| 48 | (CH2)2OCH3 | (CH2)2OCH3 | I | H3C\C/CH3 | I | CF3SO3 |
| 49 | CH3 | C3H7 | I | H3C\C/CH3 | I | CF3SO3 |
| 50 | CH3 | C5H11 | I | H3C\C/CH3 | I | CF3SO3 |
| 51 | C2H5 | C3H7 | I | H3C\C/CH3 | I | CF3SO3 |
| 52 | C2H5 | C5H11 | XVI | H3C\C/CH3 | III | CF3SO3 |
| 53 | C3H7 | C8H17 | XVI | H3C\C/CH3 | III | CF3SO3 |
| 54 | C3H7 | C14H29 | XVI | H3C\C/CH3 | III | CF3SO3 |

FIG. 46

| COMPOUND NO. | C/N (dB) | TRANSMITTANCE RATIO AFTER FADING TEST (%) | NUMBER OF READING TIMES |
|---|---|---|---|
| 30 | 49 | 23 | $1.4 \times 10^6$ |
| 31 | 48 | 24 | $1.0 \times 10^6$ |
| 32 | 51 | 19 | $2.6 \times 10^6$ |
| 33 | 50 | 21 | $2.0 \times 10^6$ |
| 34 | 48 | 23 | $1.2 \times 10^6$ |
| 35 | 52 | 19 | $3.0 \times 10^6$ |
| 36 | 51 | 20 | $2.2 \times 10^6$ |
| 37 | 50 | 23 | $1.3 \times 10^6$ |
| 38 | 52 | 19 | $2.4 \times 10^6$ |
| 39 | 51 | 21 | $1.8 \times 10^6$ |
| 40 | 49 | 24 | $1.0 \times 10^6$ |
| 41 | 51 | 21 | $1.9 \times 10^6$ |
| 42 | 50 | 22 | $1.6 \times 10^6$ |
| 43 | 48 | 25 | $0.9 \times 10^6$ |
| 44 | 49 | 23 | $1.2 \times 10^6$ |

F I G. 47

| COMPOUND NO. | C/N (dB) | TRANSMITTANCE RATIO AFTER FADING TEST (%) | NUMBER OF READING TIMES |
|---|---|---|---|
| 45 | 47 | 26 | $0.7 \times 10^6$ |
| 46 | 49 | 25 | $0.8 \times 10^6$ |
| 47 | 48 | 24 | $0.9 \times 10^6$ |
| 48 | 50 | 23 | $1.1 \times 10^6$ |
| 49 | 49 | 22 | $1.4 \times 10^6$ |
| 50 | 49 | 23 | $1.3 \times 10^6$ |
| 51 | 50 | 22 | $1.4 \times 10^6$ |
| 52 | 50 | 24 | $0.8 \times 10^6$ |
| 53 | 47 | 25 | $0.6 \times 10^6$ |
| 54 | 46 | 27 | $0.3 \times 10^6$ |

FIG. 49

| COMPOUND NO. | R | R¹ | --A-- | --- B --- | -Ⓣ= | X |
|---|---|---|---|---|---|---|
| 55 | CH₃ | CH₃ | I | H₃C\C/CH₃ | I | SCN |
| 56 | CH₃ | CH₃ | IV | H₃C\C/CH₃ | I | SCN |
| 57 | C₂H₅ | C₂H₅ | I | H₃C\C/CH₃ | I | SCN |
| 58 | C₂H₅ | C₂H₅ | IV | H₃C\C/CH₃ | I | SCN |
| 59 | C₂H₅ | C₂H₅ | XVI | H₃C\C/CH₃ | III | SCN |
| 60 | C₃H₇ | C₃H₇ | I | H₃C\C/CH₃ | I | SCN |
| 61 | C₃H₇ | C₃H₇ | IV | H₃C\C/CH₃ | I | SCN |
| 62 | C₃H₇ | C₃H₇ | XVI | H₃C\C/CH₃ | III | SCN |
| 63 | C₅H₁₁ | C₅H₁₁ | I | H₃C\C/CH₃ | I | SCN |
| 64 | C₅H₁₁ | C₅H₁₁ | IV | H₃C\C/CH₃ | I | SCN |
| 65 | C₅H₁₁ | C₅H₁₁ | XVI | H₃C\C/CH₃ | III | SCN |

F I G. 50

| COMPOUND NO. | R | R$^{(1)}$ | --A-- | --B-- | =T= | X |
|---|---|---|---|---|---|---|
| 72 | CH$_3$ | CH$_3$ | IV | H$_3$C\C/CH$_3$ | I | I |
| 73 | C$_2$H$_5$ | C$_2$H$_5$ | IV | H$_3$C\C/CH$_3$ | I | I |
| 74 | C$_3$H$_7$ | C$_3$H$_7$ | IV | H$_3$C\C/CH$_3$ | I | ClO$_4$ |
| 75 | C$_5$H$_{11}$ | C$_5$H$_{11}$ | IV | H$_3$C\C/CH$_3$ | I | ClO$_4$ |
| 76 | (CH$_2$)$_3$SO$_3$H | (CH$_2$)$_3$SO$_3$H | IV | H$_3$C\C/CH$_3$ | I | ClO$_4$ |

OPTICAL DATA RECORDING MEDIUM

BACKGROUND OF THE INVENTION

1. Field of the Invention

The present invention relates to an optical data recording medium, for example, an optical disk and the like, and more specifically, to a recording medium an organic dye.

2. Prior Art

Recently, the development of an optical recording system mainly used for recording documents has been accelerated by the progress of an optical recording laser technology and a cost reduction thereof, the system recording and reproducing data by irradiating a laser beam on an optical disk.

The optical data recording mediums in this system includes a write once type optical data recording medium wherein a recording layer composed of a recording material containing an organic dye for a heat mode is formed on a substrate forming the optical data recording medium. This type of optical data recording medium is advantageous in that it can be made at a low cost because the recording layer can be formed by a coating method and that the recording density can be increased by making the intervals between pits narrower because a dye has a lower heat transfer rate than a method using a metal thin layer.

(Problems that the Invention is to Solve)

Conventionally, there is a proposal for this optical data recording medium which is provided with a recording layer composed of a material of chalcogens metal, metal oxide and the like These materials, however, are disadvantageous in that they are rare and the manufacturing cost thereof is expensive.

Further, there are proposals to use a material composed of various types of organic dyes having an infrared absorbing property such as a material in place of the above metals, an example of which is disclosed, for example, in Japanese Patent Kokai (Laid-Open) No. 61-243445 and characterized in that a recording layer is formed of a compound having the following general formula:

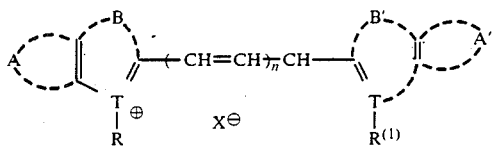

wherein, T may be equal to or different from T', in which each represents C, N, O or S, respectively.

A may be equal to or different from A', in which each represents an aromatic ring and further a substituent group $—CH_2—nSO_3^{\ominus}$ (n represents integer from 1 to 8) is attached to any one or both to form a salt with a nickel ion.

B may be equal to or different from B', in which each represents —H H— (ring-open), —O—, —S—,

—Se—, or —CH=CH—.

R and $R^{(1)}$ exist when T is C or N, R is equal to or different from $R^{(1)}$ and represent a non-substituted or substituted alkyl group of $C_1$–$C_{18}$ or a non-substituted or substituted aromatic ring.

$X^{\ominus}$ represents a halogen ion, peroxy halogenide ion, sulfonic acid ion, sulfate ion or acetate ion.

n represents an integer from 0 to 4, halogen, acetoxy, or benzoyloxy group may exist on a methyne chain at the center thereof or the methyne chain at the center may form a part of a ring.

This optical data recording medium, however, has a drawback in that it lacks sufficient durability to light and heat and sufficient resistance to reading light and further the recording layer composed of the above materials lacks sufficient enough writing sensitivity and C/N (carrier/noise) value and the like.

In addition, a conventional heat mode recording medium having a recording layer composed of polymethyne organic dye is added with anionized quencher as a stabilizer or provided with a protective layer composed of polymer a formed on a dye thin film experimentally to make the dye thin film unsusceptible to a change in a chemical structure caused by heat. The method of adding the anionized quencher as the stabilizer has a problem in that a light absorbing property and reflection factor which affect a recording property to be lowered since a dye ratio in a recording film is lowered by a decrease of the amount of dye by an increase of other substances entered therein. The method of forming the protective layer composed of the polymer has a problem in that enough pits are not formed since the protective film does not absorb light by itself and lack sufficient heat softening property. In conclusion, although both methods improve stability, both deteriorate a recording property which is very important to the recording medium, and thus these methods do not fundamentally solve the problems.

Note, that examples of the arrangement of the recording mediums previously proposed include a thin film composed of polystyrene or the like formed on a single dye recording film as a protective layer (Japanese Patent Kokai No. 58-36490), a resin layer formed on a cyanine film (Japanese Patent Kokai No. 59-203252) and the like.

SUMMARY OF THE INVENTION

An object of the Present invention is to overcome the drawbacks of the conventional technologies and to provide an optical data recording medium having excellent durability to light and heat and excellent stability.

Another object of the present invention is to solve the above drawbacks of the conventional technologies and to provide an optical data recording medium having excellent writing sensitivity and a high C/N value.

(Means of Solving the Problems)

To achieve the above objects, the present invention provides a recording layer containing an organic dye arranged with at least one anion selected from hexafluoro-phosphate ion $PF_6^-$), trifluoromethane sulfonate (E represents a non-substituted or substituted alkyl group of $C_1$–$C_{18}$ or non-substituted or substituted aromatic ring).

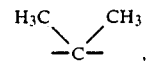

ion ($CF_3SO_3^-$) or thiocyanate ion ($SCN^-$) as the anion of an indol cyanine dye having a methyne chain.

To achieve the above object, the present invention further provides an optical data recording medium using an organic dye to a recording laYer, wherein a thin film having an optical data recording property by itself is formed on the recording layer using the organic dye as a thin layer and the recording layer contains an organic dye arranged with at least one anion selected from hexafluoro-phosphate ion ($PF_6^-$), trifluoromethane sulfonate ion ($CF_3SO_3^-$) and thiocyanate ion ($SCN^-$) as anion in an indol type cyanine having a methyne chain.

(Function)

An organic dye having $PF_6^-$ and/or $CF_6SO_3^-$ as anion arranged in an indol type cyanine dye having a methyne chain is stable to heat and light and has excellent resistance as a recording layer by itself.

Further, an organic dye having $SCN^-$ as anion arranged in the indol type cyanine having the methyne chain has very excellent writing sensitivity and a high C/N value.

Furthermore, since a polymerized dye obtained by copolymerizing an organic dye monomer added with a polymerizing group with molecules capable of being polymerized such as styrene, acrylic acid ester and methacrylic ester not only has a film forming function but also a light absorbing property and reflecting property, a film composed of the dye functions as a protective film by itself as well as contributes to form pits having a very clear and sharp edge to a recording layer when the film is irradiated by a laser beam, whereby an optical recording layer with excellent stability and recording characteristic is provided.

BRIEF DESCRIPTION OF THE DRAWINGS

FIG. 5 is a diagram illustrative of typical examples of T in the general formula of organic. dyes used in the embodiments;

FIG. 6 is a diagram illustrative of typical examples of A and A' used in the general formula, likewise;

FIG. 7 through FIG. 9 are diagrams illustrative of examples of organic dyes used in the embodiments;

FIG. 10 through FIG. 12 are characteristic diagrams illustrative of various recording layers;

FIG. 14 is an enlarged cross sectional view of the vicinity of a recording element in an optical disk of the second embodiment;

FIGS. 15 and 16 are enlarged cross sectional views of the vicinity of a recording hole in a hole type optical data recording medium to which the second embodiment is applied;

FIG. 17 is an enlarged cross sectional view of the vicinity of a recording element in an optical disk of the second embodiment;

FIGS. 18 and 19 are enlarged cross sectional views of the vicinity of a recording hole in a hole type optical data recording medium to which the second embodiment is applied;

FIG. 29 is a schematic enlarged cross sectional view of the vicinity of a recording pit in an optical disk of the fourth embodiment according to the present invention;

FIG. 43 is an enlarged cross sectional view of an optical disk of the eighteenth embodiment according to the present invention;

FIGS. 44 and 45 are diagrams illustrative of the examples of organic dyes of the nineteenth embodiment according to the present invention;

FIGS. 46 and 47 are characteristic diagrams illustrative of the result of a recording/reproducing test, light stability test and reading light resistance test of the respective optical disks of the nineteenth embodiment;

FIG. 49 is a diagram illustrative of an example of organic dye of the twenty first embodiment according to the present invention;

FIG. 50 is a diagram illustrative of comparative examples of organic dyes; and

FIGS. 51 and 52 are C/N characteristic diagrams of the optical disks of the embodiments and the comparative examples.

1 ... disk substrate, 3 ... recording layer, 8 ... thin layer, 10 ... void

BRIEF DESCRIPTION OF THE PREFERRED EMBODIMENTS

Next, embodiments of the present invention will be described with reference to drawings. (First Embodiment)

Figure 1:
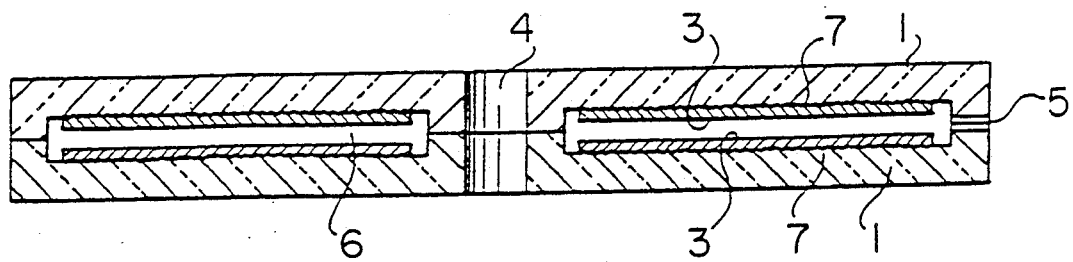
FIG. 1 is an enlarged cross sectional view of a main part of an optical disk of the first embodiment according to the present invention.
Figure 2:
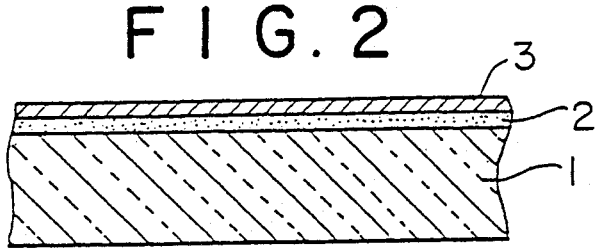
FIG. 2 is an enlarged cross sectional view of a main part of an optiCal disk of the second embodiment according to the present invention.

FIG. 1 is a vertical cross sectional view of an embodiment of an air sandwich type optical disk, and FIG. 2 is an enlarged cross sectional view of a main part of this optical disk.

In FIGS. 1 and 2, 1 designates a disk-shaped substrate, 2 designates an underlayer (refer to FIG. 2), 3 designates a recording layer, 4 designates a center hole, and 5 designates a ventilation hole including an air gap 6 formed inwardly of two bonded optical disks, and 7 designates a signal pattern such as a pregroove or prepit formed on the substrate 1.

A transparent material, for example, polycarbonate, polymethyl methacrylate, polymethyl pentene, epoxy resin, glass or the like is used for the disk substrate 1.

An autoxidation material such as, for example, polyvinyl nitrate or the like is used for the underlayer 2.

The recording layer 3 contains organic dye composed of indol type cyanine having a methyne chain and this organic dye has the following general formula:

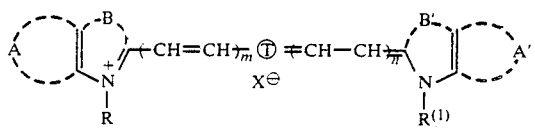

wherein ① is a carbon chain to form a methyne chain, composed of a linear chain or polycyclic compound of $C_3$—$C_{17}$, and a hydrogen atom attached to a carbon atom may be substituted by a halogen atom,

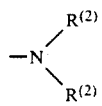

($R^{(2)}$ is a linear chain or aromatic ring of $C_1$–$C_6$);

A may be equal to or different from A' in which each represents an aromatic ring, respectively, and a hydrogen atom attached to a carbon atom may be substituted by —I, —Br, —Cl, —$C_nH_{2n+1}$ (n=1-22), —$OCH_3$—

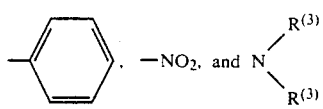

($R^{(3)}$ is a linear chain of a hydrcarbon or an aromatic ring)

B may be equal to or different from B' and in which each represents —O—, —S—, —Sn—, —CH=CH—, or

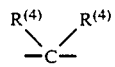

($R^{(4)}$ represents an alkyl group of $C_1$-$C_4$ such as $CH_3$, $C_2H_5$, $C_3H_7$, $C_4H_9$ and the like).

R may be equal to or different from $R^{(1)}$, in which each represents an alkyl group of $C_1$-$C_{22}$ and may be substituted by a sulfonyl group or a carboxyl group.

$X^\ominus$ represents one kinds, or two or more kinds anions selected from a $PF_6^-$, $CF_3SO_3^-$ or $SCN^-$.

m and n represent 0 or integer from 1 to 3, respectively, and have a relationship of $m+n \leqq 3$.

The recording layer 3 can be formed on the disk substrate 1 through the underlayer 2 or omitting the underlayer by any method including a solution spin coating method, a vapor-deposition method or a laminating method by Langmuir-Blodgett or a suitable combination of these methods.

Figure 5:
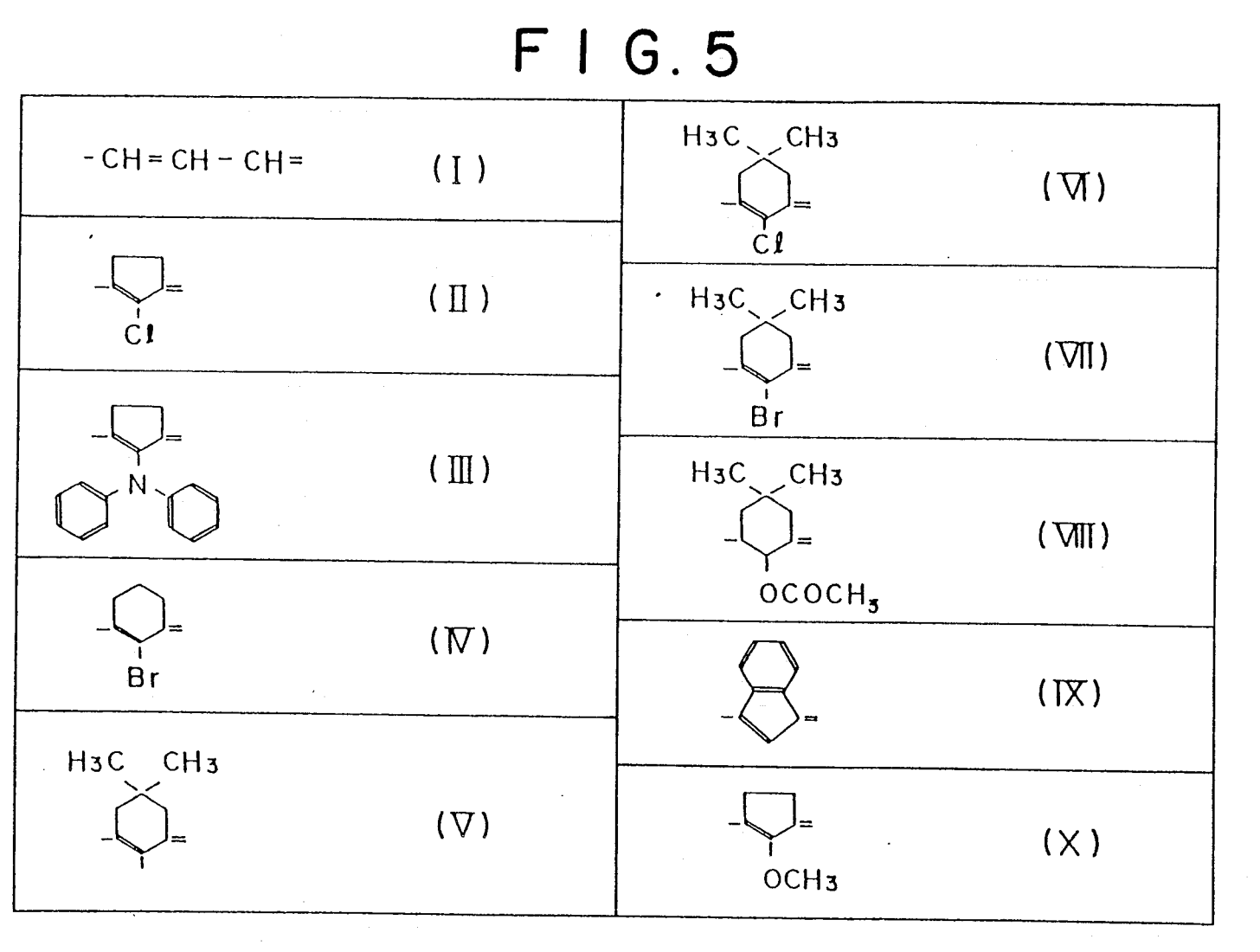

While FIG. 5 shows typical examples of ① in the general formula, any ① other than the examples shown in FIG. 5 may be used.

In addition, while FIG. 6 shows typical examples of A and A' in the general formula, any A and A' other than the examples shown in FIG. 6 may be used.

1 wt % of each of various organic dyes shown in FIGS. 7, 8 and 9 was dissolved in 1, 2 dichloroethane and this solution was applied to a disk substrate composed of polymethyl methacrylate by a spin coating method to form a recording layer and an optical disk was fabricated by a usual method. Note that FIGS. 7 and 8 (compound No. 1-29) of these figures show organic dyes used in respective embodiments of this invention and FIG. 9 (compound No. 66 -71) shows organic dyes used in comparative examples, respectively.

The respective optical disks fabricated as described above were subjected to a recording/reproducing test, a thermal stability test of the recording layers and a reading light resistance test and the results of these tests are shown in FIGS. 10, 11 and 12.

Note that as the conditions for the recording/reproducing test, signals were written using a laser beam of 830 nm having a power of 8 mW, a pulse width of 100 ns and a linear velocity of 6.0 m/sec, the signals were read out using a laser beam of 830 nm and measurement was carried out using a power of 1 mW to determined a C/N (carrier-noise) value.

The thermal stability of the recording layers were measured using a spectrometer Model UVIDEC-430B of Nippon Bunko Co., Ltd. in such a manner that a light absorption of respective recording layers after they were heated for 1500 hours at 80° C. was recorded as a remaining light absorption and their values are shown in the column of remaining light absorption ratio (%) in FIGS. 10 through 12, each of these values being shown as a percentage to a light absorption of the respective recording layers at 830 nm before they are subjected to the test.

The reading light resistance test was carried out in such a manner that signals were read out using a laser beam of 830 nm having a power of 0.5 mW and the number of reading times were counted until the reflection factor of the recording layers was lowered by 10%.

As apparent from FIGS. 10 through 12, a C/N value of 49 dB in a rather low case and a C/N value of 53 dB in a rather high case were obtained in the recording layers of this invention using hexafluoro-phosphate ion $PF_6^-$ as the anion in the organic dye, whereas a C/N ratio of 46 dB was obtained at the best in the examples as listed in FIG. 9 for comparative using iodide ion $I^-$ and perchlorate ion $ClO_4^-$ as the anion in the organic dye, and thus the C/N value of the recording layers of this invention is improved by 3 to 7 dB as compared with the examples.

In a test of deterioration caused by heating, the remaining light absorption in the case of using iodide ion $I^-$ was 61–63% and the remaining light absorption in the case using perchlorate ion $ClO_4^-$ was 66–74%, showing considerable damping, whereas the remaining light absorption of the case using hexafluoro-phosphate ion $PF_6^-$ of this invention was 79% when there is large damping and the remaining light absorption of the case was 91% when there is small damping, which shows an improvement of the minimum of 25.4% and the maximum of 49.2% as compared with the case using iodide ion $I^-$. Further, the case of this invention achieved the improvement of the minimum of 6.8% and the maximum of 37.9% as compared with the case using perchlorate ion $ClO_4^-$.

The results of the various tests show that when ① in the above general formula is $-CH=CH-CH=$ or

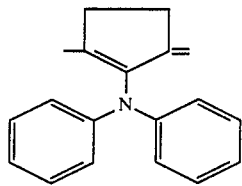

in FIGS. 7 and 8, the heat resistance and recording sensitivity of the recording layer can be improved.

In addition, when A and A' in the above recording layer are

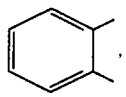

the reflection factor of the recording layer can be increased.

Further, when B and B' in the above general formula

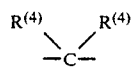

($R^{(4)}$ is an alkyl group of $C_1$–$C_4$), the solubility of the organic dye can be increased.

Furthermore, when R and R' in the above general formula is $C_2H_5$ or $C_3H_7$, the reflection factor of the recording layer can be increased.

In particular, as shown by a compound No. 7 in FIG. 7, a cyanine type dye, wherein ① is

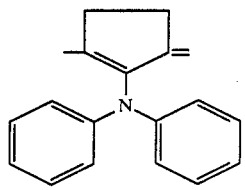

A and A' are

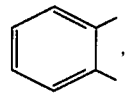

B and B' are

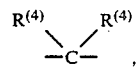

R and $R^{(1)}$ are $C_2H_5$ and X is $PF_6$ in the general formula, has an excellent heat resistance, recording sensitivity, reflection factor and solubility.

Figure 13:
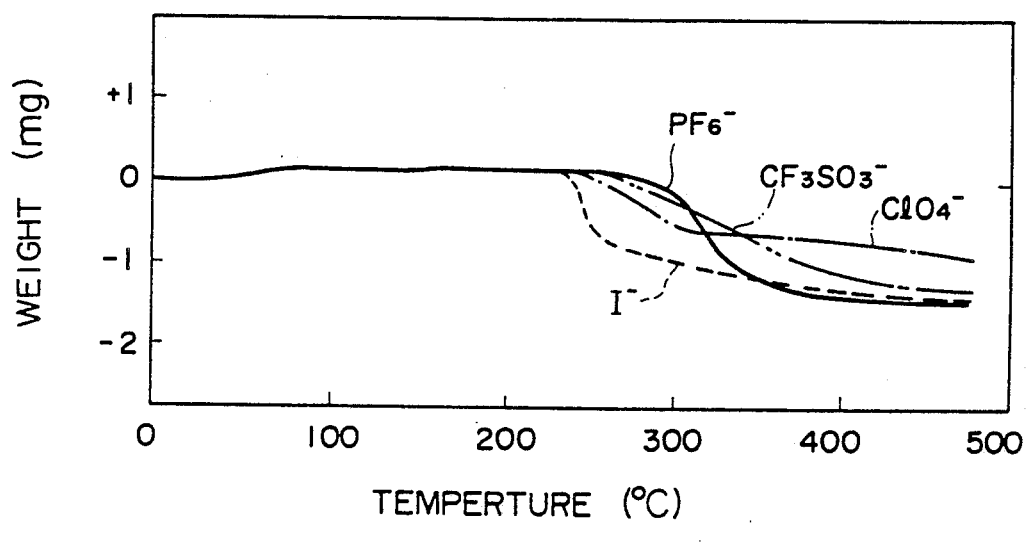
FIG. 13 is a characteristic diagram illustrative of the result of a thermogravimetric analysis of respective organic dyes.

Next, indol type cyanine dyes were synthesized which was composed of 1-metyl-2-[7-(1-metyl-3,3-dimethyl-2-indolinydene) -1,3,5-heptatrienyl]-3,3-dimethyl-indolium and iodide ion$^-$, perchlorate ion $ClO_4^-$ and hexafluoro-phosphate ion $PF_6^-$ are arranged, respectively as anions. These various kinds of the organic dyes were subjected to a thermogravimetric analysis, the result of the analysis is shown in FIG. 13, wherein a change of weight the dye using $I^-$ is shown by a dotted line, a change of weight of the dye using $ClO_4^-$ is shown by a dot-dash-line, a change of weight of the dye using $CF_3SO_3^-$ is shown by a two-dot-and-dash-line and a change of weight of the dye using $PF_6^-$ is shown by a solid line, respectively.

Note that a differential scanning calorimeter Model TAS-100 of Rigaku Denki Co., Ltd. was used as a measuring instrument, and samples were heated in nitrogen gas of a flow rate of 100 m/min. with a temperature increase rate of 20° C./min. and temperatures at which the weight of the samples began to decrease were measured.

As apparent from the result of the analysis, the organic dye arranged with $I^-$ begins to change the weight thereof at about 219° C., the organic dye arranged with $ClO_4^-$ began to change the weight thereof at about 235° C., the organic dye arranged with $CF_3SO_3^-$ of this invention began to change the weight thereof at about 250° C. and the organic dye arranged with $PF_6^-$ of this invention began to change the weight thereof at about 256° C., respectively. Then, the organic dye of this invention has an improved heat resistant temperature of about 37° C. as compared with the organic dye arranged with $I^-$ and an improved heat resistant temperature of about 20° C. as compared with the organic dye arranged with $ClO_4^-$ with a remarkably improved thermal stability.

(Second and Third Embodiments)

Figure 3:
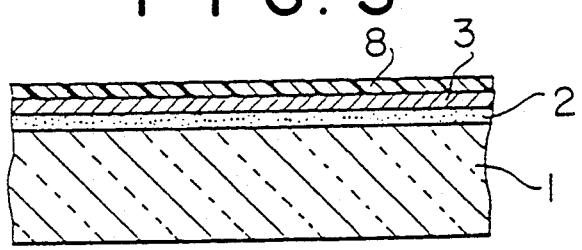
FIG. 3 is an enlarged cross sectional view of a main part of an optical disk of the third embodiment according to the present invention.
Figure 4:
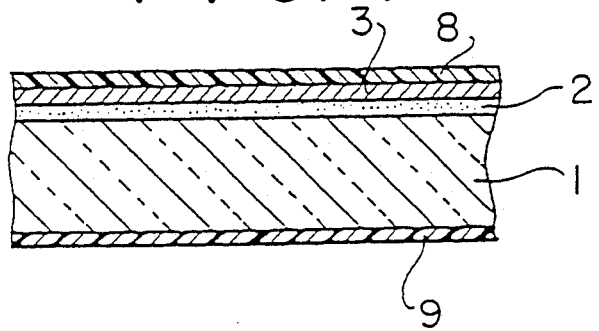
FIG. 4 is an enlarged cross sectional view of a main part of an optical disk of the fourth embodiment according to the present invention.

FIGS. 3 and 4 are enlarged vertical cross sectional views of a main part of the second embodiment and the third embodiment of an optical disk. The embodiment shown in FIG. 3 has a thin layer 8 disposed on a recording layer 3 and the embodiment shown in FIG. 4 has a protective layer 9 disposed on the surface side of a disk substrate 1.

The following hydrophilic polymers can be used as a material for the thin layer 8.
1. polyvinyl alcohol
2. polyethylene oxide
3. polyacrylic acid
4. polystyrene-sodium-sulfonate
5. polyvinyl pyrolydone
6. polymethacrylic acid
7. polypropylene glycol
8. methyl cellulose
9. polyvinyl nitrate
10. denaturated cellulose denaturated by ammonium salt This embodiment uses the polyvinyl alcohol (PVA) as the material of the thin film 8 and a water solution containing the PVA is spin coated to form the thin layer 8 having a film thickness of 120 nm.

Note that the thin film 8 must have the film thickness of 10 nm (0.01 μm) or more, and when the film thickness is less than 10 nm, pin holes are created and thus water and foreign materials penetrating through the pin holes are deposited on the recording layer 3 and create errors. Further, when an overcoat layer is additionally formed on the thin layer, an overcoat material penetrating through these pin holes is mixed with the material of the recording layer 3 and deteriorates the characteristic thereof. Therefore, the thin layer 8 preferably has the thickness of 10 nm or more. On the other hand, the thin layer 8 may have any upper limit thickness. When, however, the thin layer 8 is applied to an optical disk used for a CD, the thickness of the thin layer 3 is limited to 400 μm or less because the CD standard specifies the thickness of a substrate 1.2±0.1 mm and total thickness of the disk to $$1.2 \, {}^{+0.3}_{-0.1} \, mm$$

at present. The thickness of the thin layer 8 may be of course 400 μm or more when it is used for applications other than the CD. The film thickness of the thin layer 8 can be arbitrarily adjusted by the selection of a rotational mode of the substrate 1, a dropping condition, the concentration of a solution, the atmosphere surrounding a turn table and the like when the PVA is spin coated.

Incidentally, since the thin layer 8 is composed of the hydrophilic polymer such as the PVA and the like, its moisture resistance is lowered. Hence, the thin layer 8 is subjected to a cross-linking treatment or the like to provide it with a water-proof (moisture resistance) and a heat resistance. More specifically, a cross-linking agent or the like is added into the water solution of the hydrophilic polymer, and after the thin layer 8 is formed, a cross-linking reaction is effected by the irradiation of light or a cross-linking reaction is effected by heating. Alternatively, the thin layer 8 without the addition of the cross-linking agent is heated and crystallized (for example, since the PVA is used in this embodiment, the PVA is denaturated) or subjected to other treatments so that it is made insoluble to water, water-proof and heat resistant.

Since, however, the above cross-linking reaction effected by a light irradiation which does not require the consideration of an adverse thermal affected to the substrate 1 and the recording layer 3 and is also excellent in operating performance, this embodiment employs a technique wherein chrome is added as a cross-linking agent and the cross-linking reaction is effected in the thin layer 8 by the irradiation of light.

Examples of a cross-linking means are shown as follows and any arbitrary means can be employed as necessary.
1. an addition of an element of, for example, copper, boron, aluminum, titanium, zirconium, tin, vanadium, chrome or the like and a compound containing these elements as an inorganic cross-linking agent
2. acetal formation with aldehydes
3. aldehyde formation of hydroxyl group
4. addition of activated vinyl compound
5. etherification with epoxide compound
6. reaction of dicarboxylic acid with acid catalyst
7. addition of succinic acid and sulfuric acid
8. addition of triethylene glycol and methyl acrylate
9. blending of polyacrylic acid-methyl vinyl ether maleate copolymer Returning to FIG. 4 again, UV curing resin, acrylic resin, epoxy resin, urethane resin, polyamide resin or the like is used to the protective layer 9.

UV curing resin is preferable among the above materials, since the amount of recording, productivity in mass production and simplicity in manufacturing are good, performance of the optical recording data medium can be further improved.

Next, the conditions for spin coating a recording layer by will be described.

When the recording layer is formed by the spin coating, the result of various experiments proves it preferable that the concentration of a solution of the organic dye is in the range of 0.4–5.0 wt %. When this concentration exceeds 5.0 wt %, the film thickness of the recording layer is excessively thick, recording elements such as pits or holes are not always successfully defined when recording is effected. On the other hand, when the concentration is less than 0.4 wt %, a drawback such as pin holes and the like is caused in the recording layer formed.

The rotational speed of the disk substrate is adjusted from 350 to 6500 rpm. When the rotational speed is less than 350 rpm, a centrifugal force is insufficient, and thus a drying speed of the inner circumference of the disk substrate is different from that of the outer circumference thereof with the result of an irregular film thickness, whereas when the rotational speed exceeds 6500 rpm, the film thickness is excessively thin, and thus a desired film thickness cannot be obtained.

FIGS. 14 and 17 are enlarged cross sectional view of the vicinity of a recording element such as void or hole of the optical disk of the second embodiment shown in FIG. 3. Note that the underlayer 2 is omitted in these figures.

The recording element shown in FIG. 14 has a typical shape defined to many types of materials with the thin portion of the recording layer 3 partly remaining on the side of the thin layer 8 and serving as a void 10. On the other hand, the recording element shown in FIG. 17 has a shape defined to a particular material with the portion of the recording element 3 on the side of the thin layer 8 substantially completely melted to form a hole shaped void 10. The recording element has different shapes depending on the material of the recording layer 3, the film thickness thereof, a recording power, a beam irradiation time and the like.

While FIG. 14 and FIG. 17 describe cases wherein voids are formed in the recording layer, the voids are not always formed in the recording layer depending on the irradiation condition of a radiation beam, and the thin layer may be expanded toward the side opposite to the substrate.

A portion where a sufficient amount of energy is irradiated is heated to a high temperature so that a dye recording layer is eliminated from a substrate and at the same time a thin layer is also melted to form recording element with its edge protruded. At the time, the dye recording layer is completely eliminated from the substrate (FIG. 18) or slightly remains thereon (FIG. 15). In addition, when only the dye recording layer is formed and the thin layer is not formed, the results shown in FIGS. 19 and 17 is obtained Next, an optical interference effect of an optical data recording medium will be described with reference to FIGS. 20 and 21.

Figure 20:
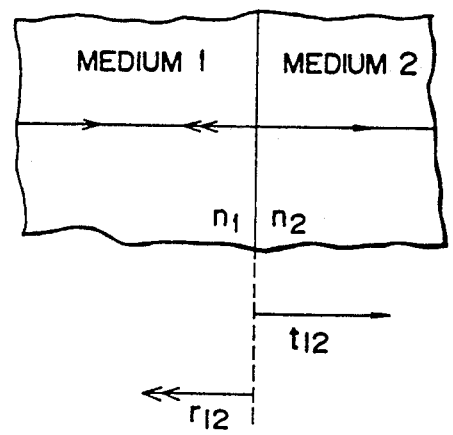
FIG. 20 is a diagram explanatory of an energy reflection factor.

FIG. 20 is a diagram explanatory of an energy reflection factor R. Assuming that an amplitude reflection factor is represented by $r_{12}$ and an amplitude transmissivity is represented by $t_{12}$ when light travels from a medium 1 to a medium 2, the amplitude reflection factor $r_{12}$ and the amplitude transmissivity $t_{12}$ in vertical incidence are expressed by the following equation using reflection factors $n_1$, $n_2$ of the mediums 1 and 2.

$$r_{12} = \frac{n_2 - n_1}{n_1 + n_2} \quad (1)$$

$$t_{12} = \frac{2n_1}{n_1 + n_2} \quad (2)$$

In addition, the energy reflection ratio R is expressed by the following equation using the amplitude reflection factor r.

$$R = |r|^2 \quad (3)$$

More specifically, assuming that an incident wave is represented by $a_0 \cos\theta$ and a composite wave is represented by $a'\cos(\theta + \Delta)$, the energy reflection factor R is expressed by the following equation.

$$R = \left(\frac{a'}{a_0}\right)^2 \quad (4)$$

Using the above, reflection factors in the following respective states were calculated.

Figure 21:
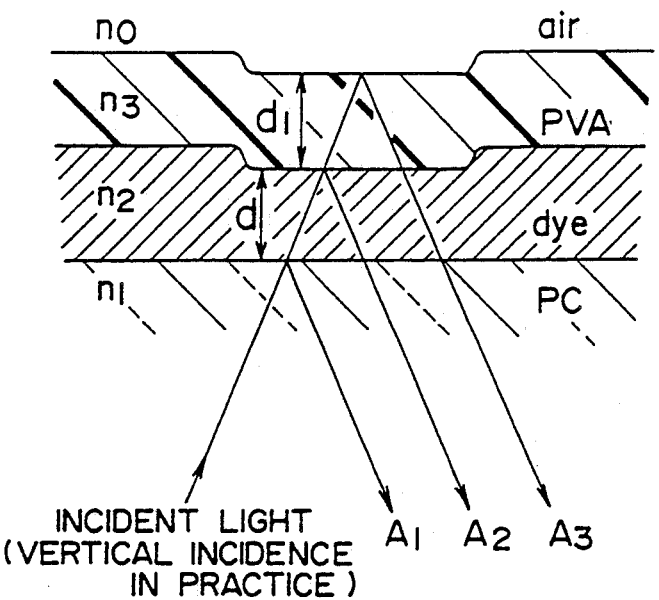
FIG. 21 is a diagram explanatory of composite light composed of light reflected at respective interfaces of an optical data recording medium composed of a substrate with a recording layer and a thin layer sequentially formed thereon.

FIG. 21 is a diagram explanatory of composite light composed of light reflected at respective interfaces of an optical data recording medium composed of a substrate with a recording medium composed of a substrate with a recording layer and a thin layer formed thereon sequentially. Respective symbols in FIG. 21 are designated as follows.

| | |
|---|---|
| PC | a substrate of polycarbonate |
| dye | a recording layer of an organic dye |
| PVA | a thin layer of polyvinyl alcohol |
| air | air (air gap) |
| $n_0$ | refraction factor of air ($n_0 = 1$) |
| $n_1$ | refraction factor of PC ($n_1 = 1.6$) |
| $n_2$ | refraction factor of dye ($n_2 = 2.7$) |

-continued

| | |
|---|---|
| $n_3$ | refraction factor of PVA ($n_3 = 1.5$) |
| $d_1$ | film thickness of PVA |
| $d_2$ | film thickness of dye |
| $A_1$ | light reflected at an interface between PC and dye |
| $A_2$ | light reflected at an interface between dye and PVA |
| $A_3$ | light reflected at an interface between PVA and air |

Light reflected at the respective interfaces $A_1$, $A_2$, $A_3$ are expressed by the following equations.

$$A_1 = r_{12}\cos\theta \quad (5)$$

$$A_3 = t_{12}r_{23}t_{21}\cos\left(\theta + \frac{4\pi n_2 d_2}{\lambda}\right) \quad (6)$$

$$A_3 = t_{12}r_{23}r_{30}t_{32}t_{21}\cos\left(\theta + \frac{4\pi(n_2 d_2 + n_3 d_1)}{\lambda}\right) \quad (7)$$

Therefore, composite light $A_1 + A_2 + A_3$ composed of light $A_1$, $A_2$, $A_3$ reflected at the respective interfaces is obtained by the following equation.

$$(A_1 + A_2 + A_3) = r_{12}\cos\theta + t_{12}r_{23}t_{21}\cos\left(\theta + \frac{4\pi n_2 d_2}{\lambda}\right) + \quad (8)$$

$$t_{12}t_{23}r_{30}t_{32}t_{21}\cos\left(\theta + \frac{4\pi(n_2 d_2 + n_3 d_1)}{\lambda}\right)$$

This equation can be expressed by $a'\cos(\theta + \Delta)$.

The energy reflection factor R is determined by solving the right side of the equation $(8) = a'\cos(\theta + \Delta)$, representing a' by r, t, n, d, $\lambda$, inserting respective values in them, and squaring the resulted value of a' (because $a_0 = 1$).

Figure 22:
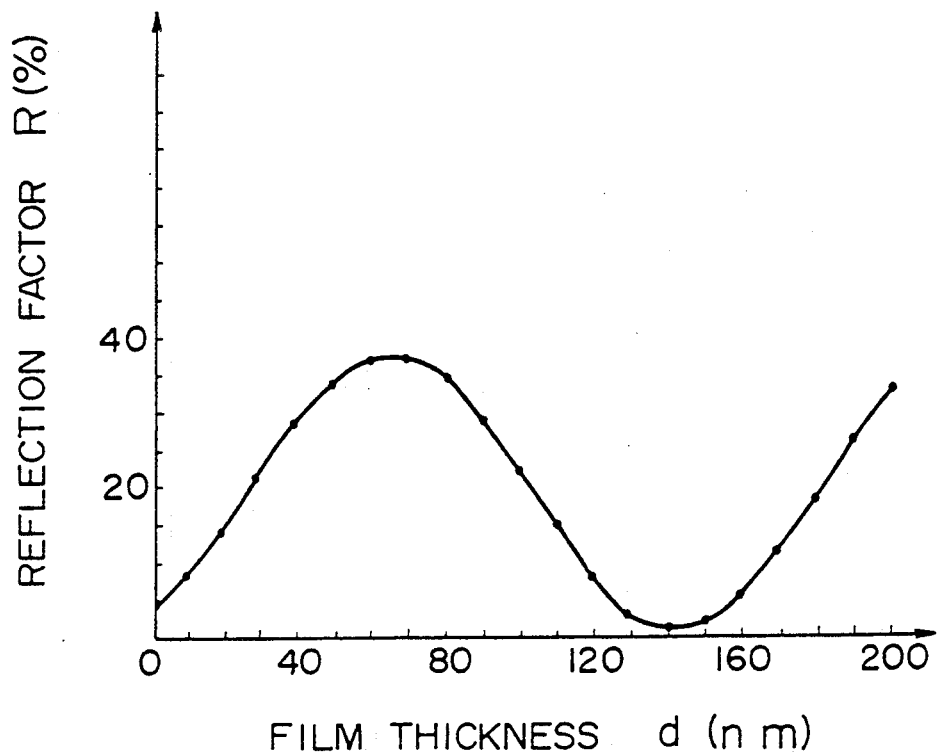
FIG. 22 is a characteristic diagram illustrative of a change of an energy reflection factor when a film thickness of a recording layer of the optical data recording medium shown in FIG. 21 is changed.

FIG. 22 is a characteristic diagram illustrative of a change of the energy reflection factor R obtained when a film thickness $d_1$ of a PVA thin layer and a wavelength $\lambda$ of incident light are fixed and a film thickness $d_2$ of a recording layer is sequentially changed in the optical data recording medium shown in FIG. 21.

Figure 23:
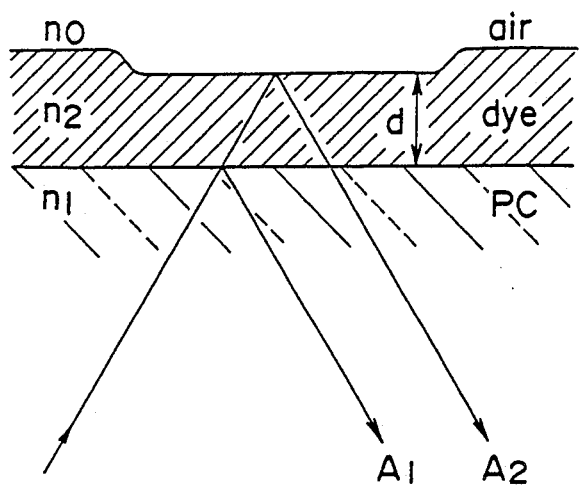
FIG. 23 is a diagram explanatory of composite light composed of light reflected at respective interfaces of an optical data recording medium composed of a substrate having only a recording layer formed thereon.

FIG. 23 is a diagram explanatory of composite light composed of light reflected at respective interfaces of an optical data recording medium composed of a substrate having only a recording layer formed thereon.

The composite light $(A_1 + A_2)$ in this case is expressed by the following equation like the case in FIG. 21.

$$(A_1 + A_2) = r_{12}\cos\theta + t_{12}r_{20}t_{21}\cos\left(\theta + \frac{4\pi n_2 D}{\lambda}\right) \quad (9)$$

$$= a'\cos(\theta + \Delta)$$

Figure 24:
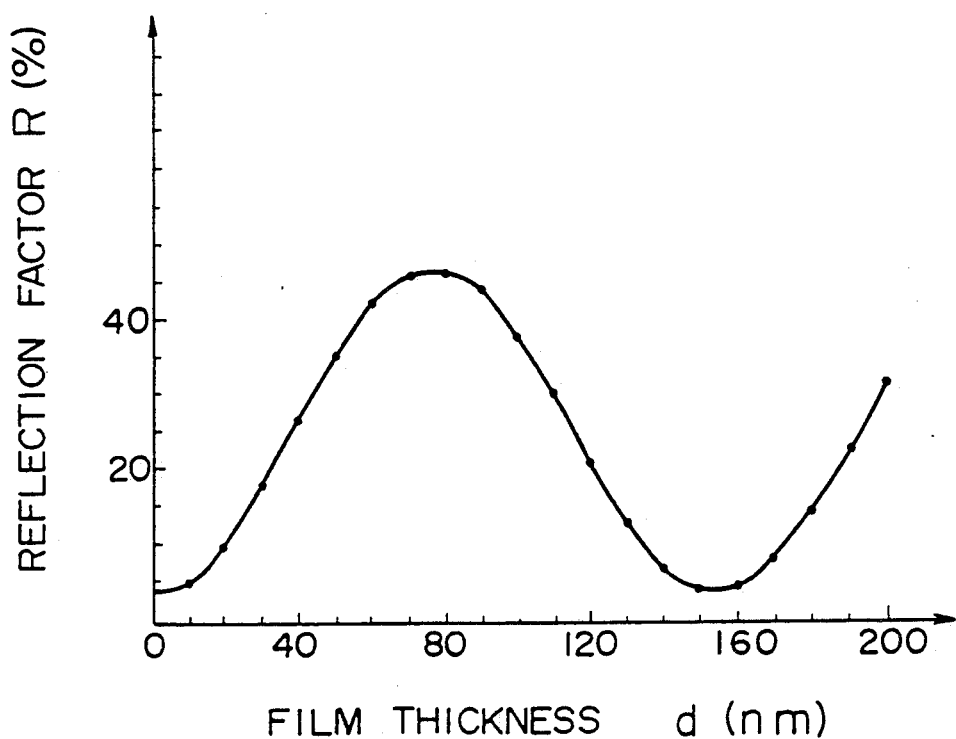
FIG. 24 is a characteristic diagram illustrative of a change of an energy reflection factor when a film thickness of a recording layer of the optical data recording medium shown in FIG. 23 is changed.

FIG. 24 is a characteristic diagram illustrative of a change of the energy reflection factor R obtained when a wavelength $\lambda$ of incident light is fixed and a film thickness d of a recording layer is sequentially changed in the optical data recording medium shown in FIG. 23.

Figure 25:
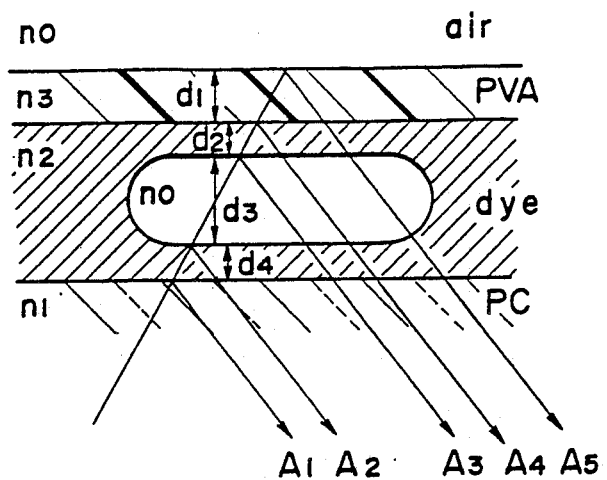
FIG. 25 is a diagram explanatory of composite light composed of light reflected at respective interfaces of an optical data recording medium composed of a substrate having a recording layer and a thin layer sequentially formed thereon and a void defined at the intermediate portion of the recording layer.

FIG. 25 is a diagram explanatory of composite light composed of light reflected at respective interfaces of an optical data recording medium composed of a substrate having a recording layer and a thin layer sequentially formed thereon and a void defined at the intermediate portion of the recording layer. Respective symbols in FIG. 25 are designated as follows.

| | |
|---|---|
| $n_0$ | refraction factor of air and a void ($n_0 = 1$) |
| $d_2$ | thickness of the recording layer remaining between a PVA layer and the void |
| $d_3$ | void thickness |
| $d_4$ | thickness of the recording layer remaining between the void and a PC substrate |
| $A_2$ | light reflected at an interface between the recording layer having the film thickness of $d_4$ and the void |
| $A_3$ | light reflected at an interface between the void and the recording layer having the film thickness of $d_2$ |
| $A_4$ | light reflected at an interface between the recording layer having the film thickness of $d_3$ and the PVA layer |
| $A_5$ | light reflected at an interface between the PVA layer and air |

Light reflected at the respective interfaces $A_1$–$A_5$ are expressed by the following equations.

$$A_1 = r_{12}\cos\theta \ldots \ldots \quad (10)$$

$$A_2 = t_{12}r_{20}t_{21}\cos\left(\theta + \frac{4\pi n_2 d_4}{\lambda}\right) \quad (11)$$

$$A_3 = t_{12}t_{20}r_{02}t_{02}t_{21}\cos\left(\theta + \frac{4\pi(n_2 d_4 + n_0 d_3)}{\lambda}\right) \quad (12)$$

$$A_4 = t_{12}t_{20}t_{02}r_{23}t_{20}t_{02}t_{21}\cos\left(\theta + \frac{4\pi(n_2 d_4 + n_0 d_3 + n_2 d_2)}{\lambda}\right) \quad (13)$$

$$A_5 = t_{12}t_{20}t_{02}t_{23}r_{30}t_{32}t_{20}t_{02}t_{21}\cos\left(\theta + \frac{4\pi(n_2 d_4 + n_0 d_3 + n_2 d_2 + n_3 d_1)}{\lambda}\right) \quad (14)$$

Therefore, composite light ($A_1+A_2+A_3+A_4+A_5$) composed of light $A_1$–$A_5$ reflected at the respective interfaces is obtained by the following equation (15).

$$(A_1 + A_2 + A_3 + A_4 + A_5) = r_{12}\cos\theta + t_{12}r_{20}t_{21}\cos\left(\theta + \frac{4\pi n_2 d_4}{\lambda}\right) +$$

$$t_{12}t_{20}r_{02}t_{02}t_{21}\cos\left(\theta + \frac{4\pi(n_2 d_4 + n_0 d_3)}{\lambda}\right) + t_{12}t_{20}r_{02}t_{23}t_{20}t_{02}t_{21}\cos\left(\theta + \frac{4\pi(n_2 d_4 + n_0 d_3 + n_2 d_2)}{\lambda}\right) +$$

$$t_{12}t_{20}t_{02}t_{23}r_{30}t_{32}t_{20}t_{02}t_{21}\cos\left(\theta + \frac{4\pi(n_2 d_4 + n_0 d_3 + n_2 d_2 + n_3 d_1)}{\lambda}\right) = a'\cos(\theta + \Delta) \quad (15)$$

Figure 26:
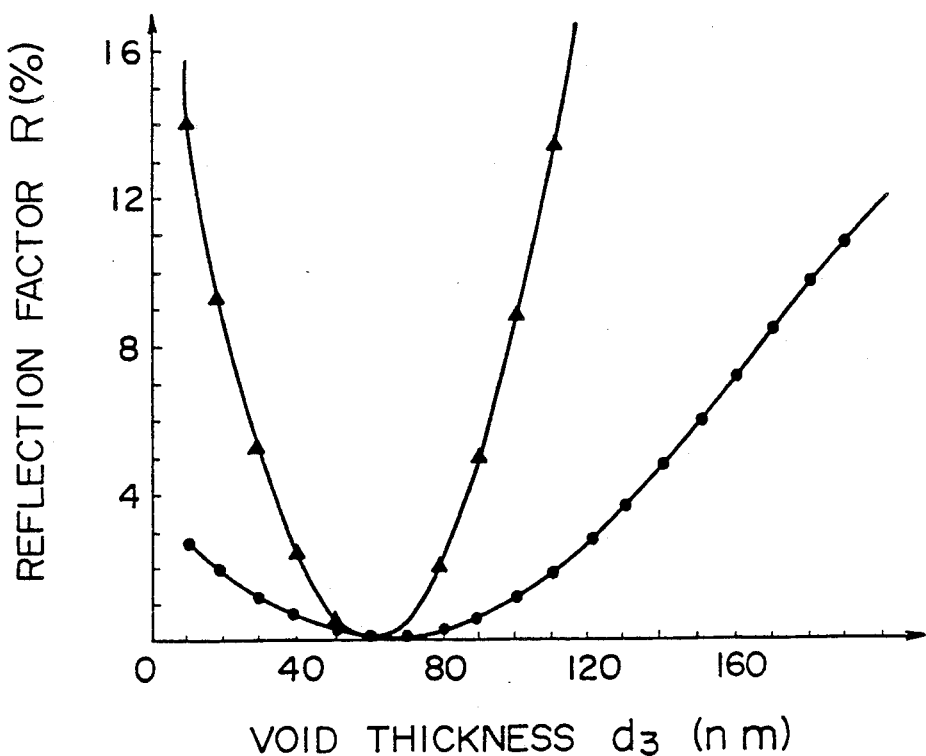
FIG. 26 is a characteristic diagram illustrative of a change of an energy reflection factor obtained when film thicknesses $d_2$ and $d_4$ in the recording layer are fixed and a void thickness $d_3$ is sequentially changed in the optical data recording medium shown in FIG. 25.

FIG. 26 is a characteristic diagram illustrative of a change of the energy reflection factor R obtained when a film thickness $d_1$ of a PVA thin layer, film thicknesses $d_2$ and $d_4$ in a recording layer and a wavelength $\lambda$ of incident light are fixed and a void thickness $d_3$ is sequentially changed in the optical data recording medium shown in FIG. 25. Note that when the values of $d_2$ and $d_4$ are decreased in FIG. 26, the energy reflection factor R moves in close to a curve shown by symbols ●, and when the values of $d_2$ and $d_4$ are increased, it moves in close to a curve shown by symbols ▲.

Figure 27:
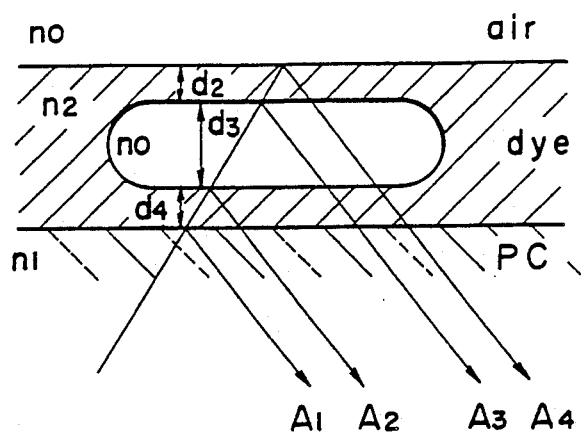
FIG. 27 is a diagram explanatory of composite light composed of light reflected at respective interfaces of an optical data recording medium composed of a substrate having only a recording layer formed thereon and a void defined at the intermediate portion of the recording layer.

FIG. 27 is a diagram explanatory of composite light composed of light reflected at respective interfaces of an optical data recording medium composed of a substrate having a recording layer formed thereon and a void defined at the intermediate portion of the recording layer. Respective symbols in FIG. 27 are designated as follows.

| | |
|---|---|
| $n_0$ | refraction factor of air and a void ($n_0 = 1$) |
| $d_1$ | thickness of the recording layer remaining between air and the void |
| $d_2$ | void thickness |
| $d_3$ | thickness of recording layer remaining between the void and a PC substrate |
| $A_2$ | light reflected at an interface between the recording layer having the film thickness of $d_3$ and the void |
| $A_3$ | light reflected at an interface between the void and the recording layer having the film thickness of $d_1$ |
| $A_4$ | light reflected at an interface between the recording layer having the film thickness of $d_1$ and air |

Light $A_1$–$A_4$ reflected at the respective interfaces are expressed by the following equation.

$$A_1 = r_{12}\cos\theta \ldots \ldots \quad (16)$$

$$A_1 = r_{12}\cos\theta \quad (16)$$

$$A_2 = t_{12}r_{20}t_{21}\cos\left(\theta + \frac{4\pi n_2 d_3}{\lambda}\right) \quad (17)$$

$$A_3 = t_{12}t_{20}r_{02}t_{02}t_{21}\cos\left(\theta + \frac{4\pi(n_2 d_3 + n_2 d_2)}{\lambda}\right) \quad (18)$$

$$A_4 = t_{12}t_{20}t_{02}r_{20}t_{20}t_{02}t_{21}\cos\left(\theta + \frac{4\pi(n_2 d_3 + n_0 d_2 + n_2 d_1)}{\lambda}\right) \quad (19)$$

Therefore, composite light ($A_1+A_2+A_3+A_4$) composed of light $A_1$–$A_4$ reflected at the respective interfaces is expressed by the following equation (20).

$$(A_1 + A_2 + A_3 + A_4) = \tag{20}$$

$$r_{12}\cos + t_{12}r_{20}t_{21}\cos\left(\theta + \frac{4\pi n_2 d_3}{\lambda}\right) +$$

$$t_{12}t_{20}r_{02}t_{02}t_{21}\cos\left(\theta + \frac{4\pi(n_2 d_3 + n_2 d_2)}{\lambda}\right) +$$

$$t_{12}t_{20}t_{02}r_{02}t_{20}t_{02}t_{21}\cos\left(\theta + \frac{4\pi(n_2 d_3 + n_0 d_2 + n_2 d_1)}{\lambda}\right) =$$

$$a' \cos(\theta + \Delta)$$

Figure 28:
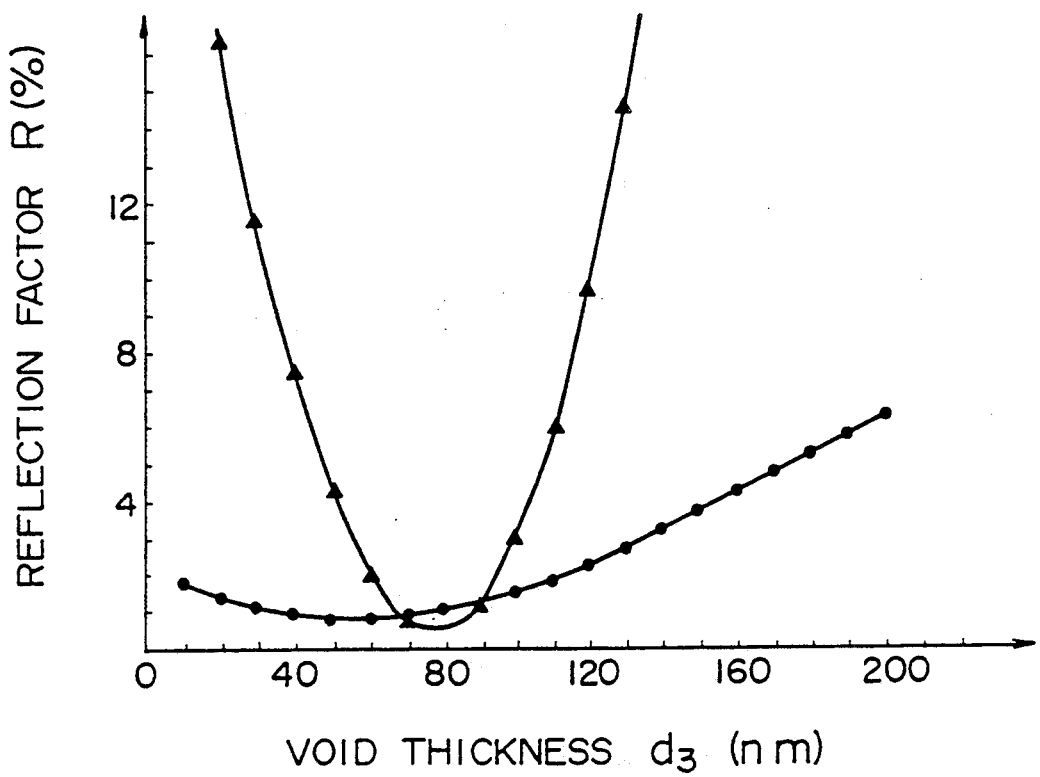
FIG. 28 is a characteristic diagram illustrative of a change of an energy reflection factor obtained when film thicknesses $d_1$ and $d_3$ in a recording layer are fixed and a void thickness $d_2$ is sequentially changed in the optical data recording medium shown in FIG. 27.

FIG. 28 is a characteristic diagram illustrative of a change of the energy reflection factor R obtained when film thickness $d_1$ and $d_3$ in a recording layer and a wavelength $\lambda$ of incident light are fixed and a void thickness $d_2$ is sequentially changed in the optical data recording medium shown in FIG. 27. Note that when the values of $d_1$ and $d_3$ are decreased in FIG. 28, the energy reflection factor R moves in close to a curve shown by symbols ●, and when the values of $d_1$ and $d_3$ are increased, it moves in close to a curve shown by symbols ▲.

A recording element is read by a difference between a reflection factor of an unrecorded portion and a reflection factor of a recorded element portion. Consequently, when a larger difference between the reflection factor of the unrecorded portion and the reflection factor of the recorded element portion is provided, a larger modulation degree is obtained. An optical data recording medium having a recording element defined according to the void shape shown in FIGS. 25 and 27 can be provided with a larger difference between the reflection factor of the unrecorded portion and that of the recorded element portion larger than a difference between those of an optical data recording medium having a recording element defined according to a pit shape shown in FIGS. 21 and 23. That is, a higher modulation degree can be obtained.

Note that the range of a film thickness of respective portions in FIGS. 25 and 27 is as follows.

The film thickness of the respective portions in FIG. 25:

| $d_1$ (PVA) | 1 nm–10 μm |
|---|---|
| $d_2$ (dye) | 1 nm–5 μm |
| $d_3$ (void thickness) | 1 nm–5 μm |
| $d_4$ (dye) | 1 nm–5 μm |

The film thicknesses of the respective portions in FIG. 27:

| $d_1$ (dye) | 1 nm–5 μm |
|---|---|
| $d_2$ (void thickness) | 1 nm–5 μm |
| $d_3$ (dye) | 1 nm–5 μm |

(Fourth Embodiment)

FIG. 29 is an enlarged cross sectional view of another schematic example of a recording element of the fourth embodiment of the present invention. As shown in FIG. 29, a fibriform 11 by formed depending on the material and physical properties of the recording layer 3 and the irradiating conditions of a laser beam.

In addition, the void 10 is not always composed of a single bubble but may be composed of the collection of a plurality of or a multiplicity of bubbles as a whole.

(Fifth Embodiment through Tenth Embodiment)

FIG. 30 through FIG. 35 are schematic enlarged cross sectional views of fifth through tenth embodiments of a recording element when an optical data recording medium omitting an underlayer is used.

Figure 30:
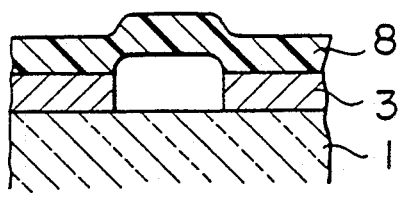
FIG. 30 through FIG. 42 are schematic enlarged cross sectional views of the vicinity of a recording pit of the fifth embodiment through the seventeenth embodiment according to the present invention.

In the case of FIG. 30 (the fifth embodiment), a portion of a recording layer 3 where a laser beam is irradiated disappears from the surface of a substrate 1 and the portion of a thin layer 8 corresponding to the disappeared portion is pushed upwardly to a substantially angular shape.

Figure 31:
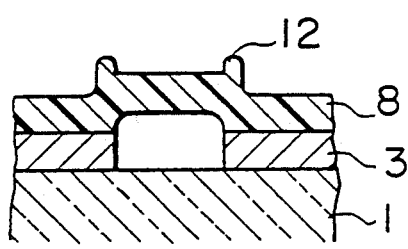

In the case of FIG. 31 (the sixth embodiment), while a portion of a thin layer 8 is pushed upwardly like the thin layer in FIG. 30, an annular projection 12 is defined around the portion pushed upwardly.

Figure 32:
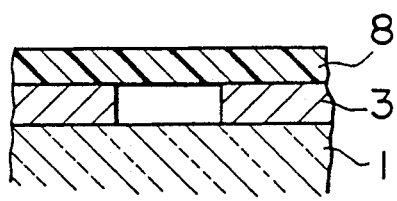

In the case of FIG. 32 (the seventh embodiment), while a portion of a recording layer 3 where a laser beam is irradiated disappears from the surface of a substrate 1, a thin layer 8 is not deformed.

Figure 33:
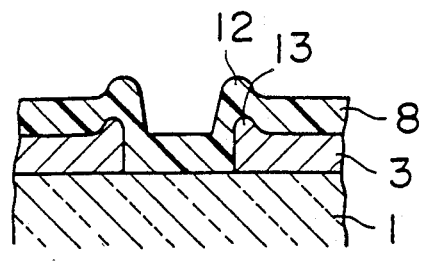

In the case of FIG. 33 (the eighth embodiment), a portion of a recording layer 3 where a laser beam is irradiated disappears from the surface of a substrate 1 and an annular projection 13 is defined around the diappeared portion. On the other hand, a thin layer 8 is recessed toward the disappeared portion.

Figure 34:
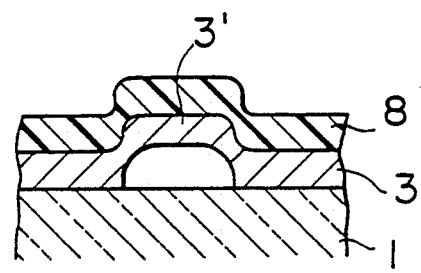
Figure 35:
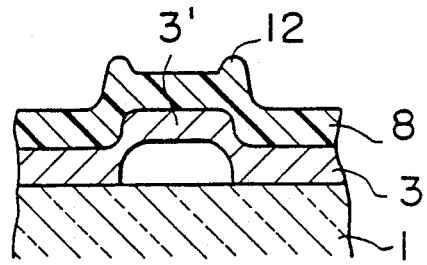
Figure 36:
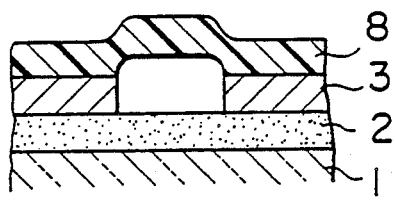
Figure 37:
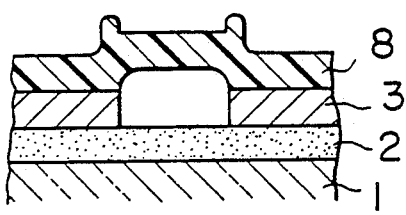
Figure 38:
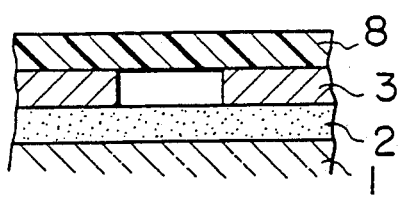
Figure 39:
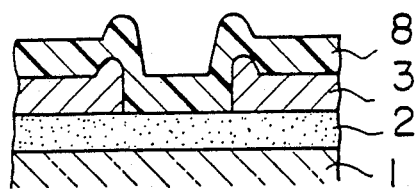
Figure 40:
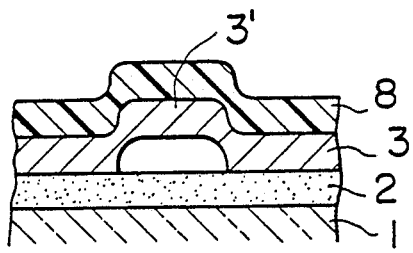
Figure 41:
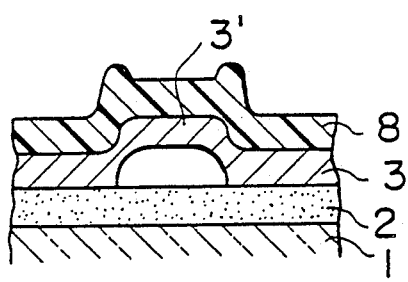
Figure 42:
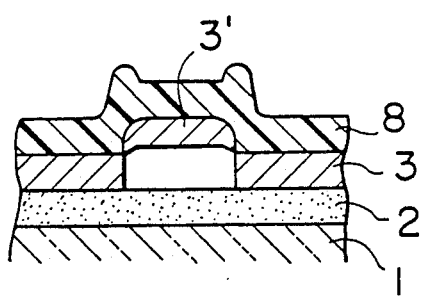

In the cases of FIGS. 34 and 35 (the ninth and tenth embodiments), a material of a recording layer 3 is partly attached to the inner surface of a thin layer 8 again. While the recording layer 3' attached to the inner surface of the thin layer 8 is principally continuous to the recording layer 3, it is separated from the recording layer 3 in some cases.

(Eleventh Embodiment through Seventeenth Embodiment)

FIG. 36 through FIG. 42 are enlarged cross sectional views of the respective recording elements of an eleventh embodiment through a seventeenth embodiment using an optical data recording medium provided with an underlayer 2.

Since the other configuration except the underlayer 2 is the same as those shown in FIG. 30 through FIG. 35, the further description thereof is omitted. In the sixteenth embodiment shown in FIG. 41, while a recording layer 3' attached again is coupled with a recording layer 3, in the seventeenth embodiment shown in FIG. 42, the recording layer 3' attached again is apart from the recording layer 3.

(Eighteenth Embodiment)

FIG. 43 is an enlarged cross sectional view of a main part of an optical disk of an eighteenth embodiment of the present invention. In this embodiment, a thin layer 8a is composed of a material capable of recording optical data by itself. Next, the arrangement of this thin layer 8a will be described.

First, a polmerized monomer to which dye molecules having a chromophoric group in the molecules is added by esterification is synthesized.

The polymerizable monomer used here includes:
(acrylic monomer)
    acrylic acid, acrylic ester, methacrylic acid, methacrylic ester and the like
(styrene monomer)
    styrene, α-methyl styrene, divinyl benzene, chloro styrene, cyano styrene, amino styrene, hydroxy styrene and the like (acrylamide monomer)
  acrylamide, methacrylic amide, diacetone acrylamide and the like
(fatty acid vinyl ester monomer)
  vinyl acetate, vinyl ester and the like
(nitrile and isonitrile monomer)
  acrylonitrile, methacrylonitrile, adiponitrile, phthalonitrile, isonitrile and the like
(vinyl ester monomer)
  alkyl vinyl ether and the like
(halogenated olefine monomer)
  vinyl chloride, vinylidene chloride, vinyl bromide, vinyl fluoride, vinylidiene fluoride and the like
(conjugated diene monomer)
  butadiene, isoprene, chloroprene, fluoroprene, cyanoprene
(N-vinyl compound monomer)
  vinyl cyanine and the like
(olefinic monomer)
  ethylene, propylene, isobutylene and the like The following are used as the radical polymerization initiator:
(azo initiator)
  azobis isobutylo nitrile and the like
peroxide initiator)
  benzoyl peroxide, di-tert-butyl peroxide, potassium persulfate and the like
(water soluble redox initiator)
  cumene hydroperoxide and amine and the like
(waterinsoluble redox initiator)
  hydroperoxide, benzoyl-peroxide and the like, and dimethyl aniline, cobalt naphthenate and the like Further, when the radiation-induced polymerization is carried out, a photochemical initiator such as a ultra-violet rays sensitizer, visible rays sensitizer and the like is added.

The kinds of the dyes to be used are as follows. methine dye, polymethine dye, cyanine dye, carbocyanine dye, anthraquinone dye, azo dye, phthalocyanine dye, squalirium dye, azulenium dye and the like.

In addition, the dye molecules bond directly or through the following bonding group to the above polymerizable monomer.
(R; hydrogen, alkyl group)
  —O—, —CO—, —COO—, —OCO—, —SO$_2$—, —O-COO—, —NR—, —CONR—, —CONRCO—, —NRCO—, —S—, —SO$_2$NR, RSO$_2$— and the like The methods by which a polymerizable monomer is bonded to a dye or makes a chain with the dye are:
(M; monomer, D; dye)
(1) an example of polymer of polymerizable monomer to which dye is bonded:

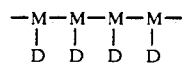

(2) an example wherein a monomer not bonded to a dye and a monomer bonded to the dye are polymerized simultaneously:

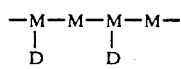

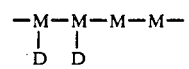

(3) an example of a polymer chain of a dye monomer and another monomer or a polymer chain including a polymerized dye portion therein:

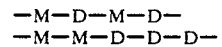

(4) an example of a polymer chain including a polymerizable monomer, a polymerizable monomer bonding a dye or, polymerized dye or a dye portion having a polymerizability:

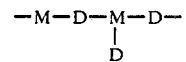

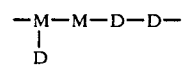

Note that the monomers are not limited to the same type but different types may be used.

In addition, when a thin layer is formed on an optical data recording medium having a substrate, underlayer and recording layer arranged in this order, this thin layer may not greatly damage the sensitivity of the recording layer.

When the light absorbing spectrum of the dye used in these thin layers has a strong absorption to visible rays or ultraviolet rays, it is possible to improve a preserving deterioration as an optical data recording medium. In this case, however, a dye concentration in the dye polymer thin layer and the thickness of the thin layer is preferably in the range which does not greatly damage a C/N characteristic.

When the light absorbing spectrum of the dye used in the thin layer is similar to that of the recording layer, it is apparently admitted that recording elements having a clear edge can be formed by the irradiation of a laser beam and further stability to reading light is greatly improved by that the dye polymer thin layer is formed on the recording film, although the recording sensitivity is a little different depending on the dye concentration of the dye polymer used in the thin layer and the thickness thereof.

Polymerized monomers composed of an acrylic acid monomer or methacrylic acid monomer added with dye molecules having chromophore in the molecules by esterification or the like are, for example, as follows:

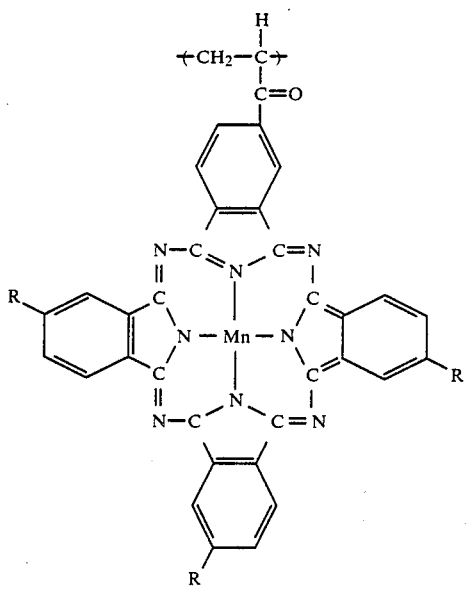

where R represents COOH, H, an alkyl group, acryloyl group, alkyl ester group, phenyl group, phenyl ester, those having COOH or H at the end thereof, alkoxy group and the like. In the case of this embodiment, R represents $OCOC_4H_9$.

The polymerizable monomer (A) obtained as described above is added with a polymerization initiator such as azobis isobutylo nitrile (AIBN) or the like together with methyl acrylate (B) like a usual radical polymerization and heated in a solvent such as dimethyl sulfoxide (DMSO) to obtain a copolymer. In this case, the mol ratios of the above (A) and (B) are as shown below.

Table 1

| Sample No. | (A):(B) |
| --- | --- |
| 1 | 1:100 |
| 2 | 3:100 |
| 3 | 10:100 |
| 4 | 20:100 |
| 5 | 30:100 |
| 6 | 40:100 |

A protective film was formed using these various solutions by spin coating.

A solution made by dissolving manganesephthalocyanine/acrylic acid methyl copolymer synthesized in advance in methyl isobutyl ketone (MIBK) was deposited on the surface of a recording layer to a thickness of 10 nm by spin coating to form an optical data recording medium having a total thickness of 70 nm.

When writing was effected to this medium by a semiconductor laser beam having a wavelength of 830 nm at an output of 7 mW, the samples Nos. 3-6 are provided with recording elements of which vicinity has a sharp configuration like a single dye film, although the samples Nos. 1 and 2 are provided with recording elements of which vicinity had a little blunt configuration.

With respect to light stability, degrees of fading were compared using a fademeter with the result that all of the samples had a faded grade smaller than that of a single manganese-PC film and then it is understood that stability was improved.

On the other hand, a light absorbing property and a reflection factor were not lowered and recording/reproducing characteristics remained at a high level.

When, however, a thickness of the thin layer is made to 10 nm or more, that is, as thick as about 50% of the thickness of the overall recording medium, the polymer used in the thin layer has preferably a higher ratio of dyestuff and it must be selected from samples Nos. 3-6 in the Table 1.

In addition, while the type of the dye used for the polymerization is preferably the same as the type of the single dye, a different type of dye may be used as long it has λ max. of 830 nm in a light absorbing spectrum. Any combination of the dyes is applicable, when the combination can form recording elements which are disposed in a very close vicinity each other and have high performance in an overall characteristic.

COMPARATIVE EXAMPLE

A dye to be used here was the same as that used in the embodiments and an optical data recording medium was made in such a manner that a recording layer was formed on a disk substrate like the embodiments and a thin film of 10 nm was formed thereon by applying a solution obtained by dissolving ½ sec. nitro cellulose in cyclohexanone.

When laser writing was effected to this example under the same conditions as the embodiments, the surface film of pits was in the state as if it was burst and its circumferential edge was considerably disarranged and only the result obtained was a bad C/N value, which proved that this comparative example could not be practically used.

Table 2 shows the change of reflection factors of the samples No. 1-6 and the comparative example at 830 nm before and after an acceleration test was carried out. Note that this acceleration test was effected to measure the reflection factors at 60° C. and 90% RH after 1000 hours. The reflection factors were represented by the values measured by a integrating sphere.

Table 2

| Sample No. | Reflection factor (%) | |
| --- | --- | --- |
| | Before acceleration best | After acceleration test |
| 1 | 27 | 25 |
| 2 | 27 | 26 |
| 3 | 27 | 26 |
| 4 | 28 | 26 |
| 5 | 30 | 29 |
| 6 | 30 | 29 |
| Comparative example | 27 | 22 |

As apparent from Table 2, the sample Nos. 1-6 of this invention have the reflection factors which are less lowered and thus are excellent in stability.

(Nineteenth Embodiment)

Next, a nineteenth embodiment will be described. This embodiment is provided with a recording layer containing an indol type cyanine organic dye having a methyne chain of the following general formula, wherein trifluoromethane sulfonate ion $CF_3SO_3^-$ is particularly arranged as anion $X^\ominus$ in the indol cyanine organic dye. general formula

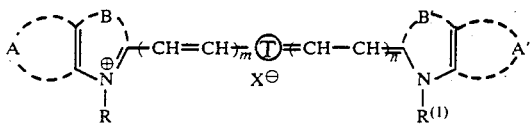

Typical examples of and A, A' in this general formula are the same as those shown in FIG. 6 and thus the description thereof is omitted.

1% of various organic dyes shown in FIGS. 44 and 45 (with respect to ⓣ and A in Tables, refer to FIG. 6) were dissolved in 1,2-dichloro ethane and this solution was applied to methyl methacrylate substrates by spin coating to form recording layers of 60 nm.

A water solution containing 4% of polyvinyl alcohol added with ammonium dichromate (cross-linking agent) was applied to the recording layers by spin coating to form a film of 60 nm. This film was dried and subjected to a cross-linking treatment by being irradiated by ultraviolet rays and formed to a thin layer, whereby optical disks were made, respectively.

A recording/reproducing test, light stability test, and reading light resistant test were carried out to the respective optical disks and the results thereof are shown in FIGS. 46 and 47.

The recording/reproducing test carried out measurements using a laser beam of 830 nm with a writing power of 8 mW, a pulse width of 100 ns, a linear velocity of 6 m/sec. and a reading out power of 1 mW to determine C/N values.

The light stability test was effected using a fedometer of Atlas Co., Ltd. to compare fading properties caused by a xenon arc beam. Note that a spectrometer Model UV IDEC-430B of Nippon Bunko Co., Ltd. was used to determine a transmittance at a wavelength of 830 nm in 30 hours after exposure was effected using a xenon beam.

In the reading light resistant test, a laser beam of 830 nm was used and the number of reading times was measured until a signal could not be read when reading light of 0.5 mW was irradiated.

The dye of this embodiment contained $CF_3SO_3^-$ arranged as the anions thereof, and the example to be compared with the embodiment used the organic dye contained $ClO_4^-$ arranged as the anions thereof.

All of the C/N values in FIGS. 46 and 47 are in the range of 46–53 dB and are not inferior to those of the above comparative example.

The light stability test shows that there are considerable differences caused by the different anions. The transmittance of the organic dye using $CF_3SO_3^-$ as anions is within the range of 19–27% after the fading test, whereas the organic dye using $I^-$ or $ClO_4^-$ as anions has the transmittance increased to 32–40% under the same test conditions and thus this organic dye has a problem in the light stability. As described above, there is a difference of 5–21% in the transmittance between the embodiments and the comparative example after the fading test, and it is found that $CF_3SO_3^-$ is superior to $I^-$ or $ClO_4^-$ in light durability.

In the reading light resistant test, the organic dye of this embodiment has the number of reading times of $0.3 \times 10^6$–$3.0 \times 10^6$ until a signal can not be read. On the other hand, the organic dye using $I^-$ or $ClO_4^-$ has the number of reading times of $7.1 \times 10^3$–$6.1 \times 10^4$, in the same test, and thus there is a difference of the maximum of about two digits, which proves the superiority of this embodiment.

The result of the thermogravimetric analysis of the organic dye of the embodiment including $CF_3SO_3^-$ arranged as the anions thereof is shown by a two-dot-and-dash curve in FIG. 13. The temperatures at which the thermal decomposition of the organic dyes containing the respective anions arranged as the anions thereof begins is read from FIG. 13 and summarized in Table 3.

Table 3

| Anions | Thermal decomposition start temp. (°C.) |
|---|---|
| $I^-$ | 219 |
| $ClO_4^-$ | 235 |
| $CF_3SO_3^-$ | 250 |
| $PF_6^-$ | 256 |

As apparent from Table 3, it is found that the organic dyes containing $CF_3SO_3^-$ and $PF_6^-$ arranged as the anions thereof have a higher thermal decomposition start temperature than those containing $I^-$ and $ClO_4^-$ arranged as the anions thereof and thus have a superior heat resistance.

(Twentieth Embodiment)

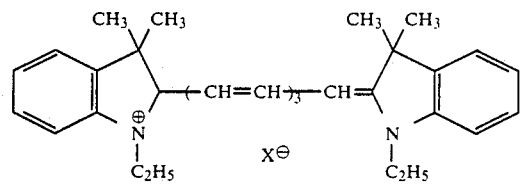

Organic dyes were made by synthesizing an indol type cyanine dye having the above chemical structure and arranging $CF_3SO_3^-$, $I^-$ or $ClO_4^-$ thereto as anions. Then, an electrochemical decomposition voltage of the respective organic dyes was measured by an incremental voltage step method (IVSM).

This measuring method was such that propylene carbonate solutions containing the respective dyes were added to a polypropylene cell and a gold electrode plate was disposed through a separator. These dye solutions had the concentration at which the dyes were saturated.

After the electrochemical cell arranged as described above was placed in an argon substituted bath and kept in a thermodynamics equilibrium state, a voltage V was increased by $\Delta V$ to make the cell in a charged state. This charged state was continued until a current I became $I = I_{min}$, and when $I = I_{min}$ was reached, the voltage was further increased by $\Delta V$ to repeat the same process. This process was repeated until the voltage V reached $V_{max}$. With this method, the strength of bonding of the various anions of $CF_3SO_3^-$, $I^-$ and $ClO_4^-$ to the skeleton of the dye molecules can be measured with high accuracy.

Figure 48:
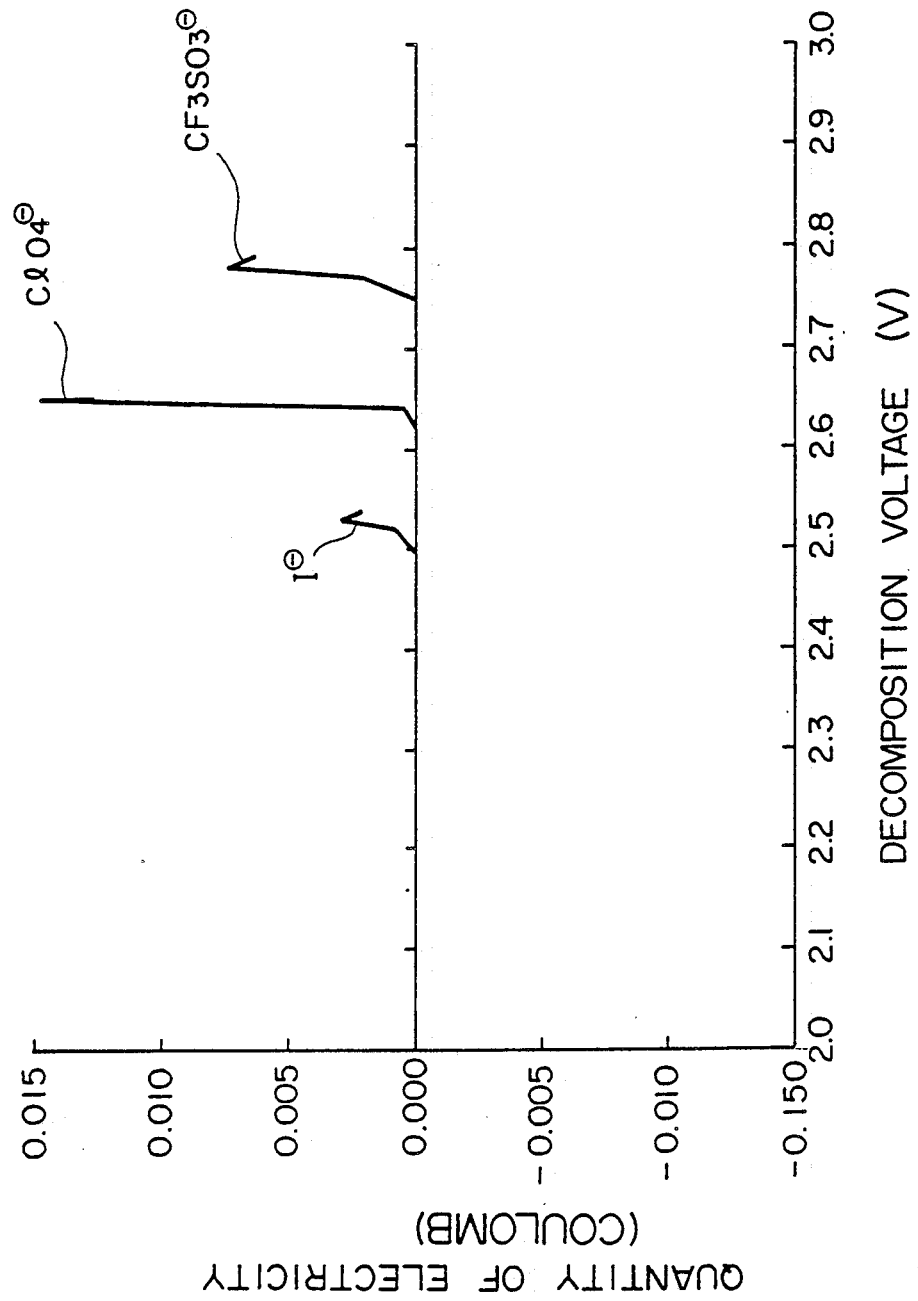
FIG. 48 is a characteristic diagram illustrative of an electrochemical decomposite voltage of respective organic dyes by an IVSM method.

As apparent from FIG. 48, the decomposition voltage of the organic dye having $I^-$ is 2.50 V in the polypropylene carbonate, the voltage of the organic dye having $ClO_4^-$ is 2.63 V, whereas the voltage of the organic dye having $CF_3SO_3^-$) is as high as 2.75 V, which shows that the anion ($CF_3SO_3^-$) has strong bonding strength to the skeleton of the dye molecules and thus has excellent stability.

(Twenty First Embodiment)

Next, a twenty first embodiment will be described. This embodiment is provided with a recording layer containing an indol type cyanine organic dye having a methyne chain of the following general formula, wherein thiocyanate ion SCN⁻ is particularly arranged as anions X⊖ in the indol cyanine organic dye. General formula

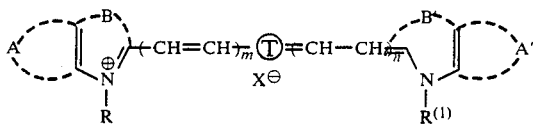

Typical examples of and A, A' in this general formula are the same as those shown in FIG. 6 and thus the description thereof is omitted.

1% of various organic dyes shown in FIG. 49 (with respect to and A in Tables, refer to FIG. 6) were dissolved in 1,2-dichloro ethane and this solution was applied to methyl methacrylate substrates by spin coating to form recording layers of 60 nm.

A water solution containing 4% of polyvinyl alcohol added with ammonium dichromate (cross-linking agent) was applied to the recording layers by spin coating to form a film of 60 nm. This film was dried and subjected to a cross-linking treatment by being irradiated by ultraviolet rays to be formed to a thin layer, whereby optical disks were made, respectively.

FIG. 50 is a diagram showing the dyes used in comparative examples, wherein I⁻ and ClO₄⁻ are used in anions.

A recording/reproducing test was carried out for the optical disks made using the various organic dyes shown in FIGS. 49 and 50 and the result thereof is shown in FIGS. 51 and 52. The recording/reproducing test carried out measurements using a laser beam of 830 nm with a writing power of 5 mW, a pulse width of 100 ns, a linear velocity of 6 m/sec. and a reading out power of 1 mW to determine C/N values.

As apparent from FIGS. 51 and 52, the C/N values of the comparative examples are in the range of 40–44 dB, whereas the C/N values of the embodiments are as high as 47–53 dB, so that it is found that the embodiment has excellent writing sensitivity.

(Twenty Second Embodiment)

Although the organic dye arranged with SCN⁻ as anions is excellent in light sensitivity, as shown in the twenty first embodiment, it has a drawback in a light resistance. Then, this embodiment added an infrared rays absorbing agent in a recording layer to improve the light resistance while keeping the excellent light sensitivity.

This type of infrared ray absorbing agent can be arbitrarily determined in relation with the organic dye. The infrared rays absorbing agent includes the following examples:

1. metal complex compound, brand names; PA1001, PA1005, PA1006 of Mitsui Toatsu Kagaku Co., Ltd.
2. bis-di-thio-Nickel complex compound, brand name; NKX-114 of Nihon Kanko Sikiso Laboratory Ltd.
3. diimonium type organic compound, brand name; IRG-002 IRG-003, IRG-009, IRG-010 of Nihon Kayaku Co., Ltd.

The above absorbing agents of 20 wt % or less were added to an organic dye. Note that when a film is formed, it is dissolved in a solution made by mixing two or more types of solvent, such as alcohol solvent and halide solvent or in an alcohol solution and spin coated on the substrate.

The present invention arranged as above can provide an optical data recording medium having excellent durability to light and heat and superior stability.

Further, the present invention can provide an optical data recording medium having excellent writing sensitivity.

What is claimed is:

1. An optical data recording medium, comprising a recording layer containing an organic dye, wherein said organic dye has the following formula:

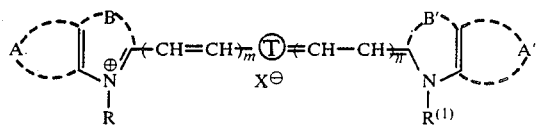

wherein is a carbon chain or ring to form a methyne chain, composed of —CH=CH—CH= or

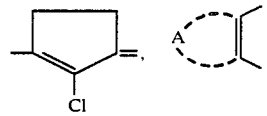

may be equal to or different from

and at least one represents a benzene ring or monochlorobenzene ring,

B may be equal to or different from B' and at least one represents

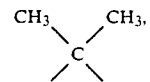

R may be equal to or different from R(1), in which each represents CH₃, C₂H₅, C₃H₇, C₅H₇ or C₅H₁₁.

m and n each represents 0 or an integer of from 1 to 3, respectively, and have a relationship of $m+n \leq 3$, associated with an anion selected from hexafluoro-phosphate ion (PF₆—), trifluoromethane sulfonate ion (CF₃SO₃—) or thiocyanate ion (SCN—), as the anion in an indol cyanine dye having a methyne chain.

2. The optical data recording medium according to claim 1, wherein ⓣ is —CH=CH—CH=.

3. The optical data recording medium according to claim 1, wherein

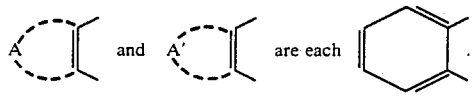

4. The optical data recording medium according to claim 1, wherein B and B' are each

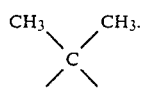

5. The optical data recording medium according to claim 1, wherein R and R' are the same and are both $C_2H_5$ or $C_3H_7$.

6. The optical data recording medium according to claim 1, wherein

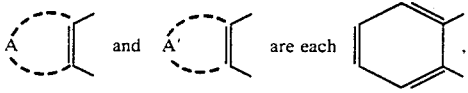

B and B' are each

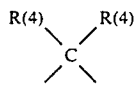

in which R(4) represents an alkyl group of $C_1$-$C_4$, and R and R(1) are each $C_2H_5$.

7. The optical data recording medium according to claim 1, wherein a thin layer having a thickness of 10 nm to 400 μm and composed of a hydrophilic polymer is formed on said recording layer.

8. The optical data recording medium according to claim 7, wherein at least one hydrophilic polymer selected from polyvinyl alcohol or denatured cellulose is used as the material of said thin layer.

9. The optical data recording medium according to claim 4, wherein said thin layer is cross-linked.

10. The optical data recording medium according to claim 7, wherein an overcoat layer is further formed on said thin layer.

11. An optical data recording medium using an organic dye for a recording layer, comprising:
a thin film having an optical data recording property by itself formed, as a thin layer, on said recording layer using the organic dye, and said recording layer contains an organic dye associated with at least one kind of anion selected from a group of hexafluoro-phosphate ion ($PF_6-$), trifluoromethane sulfonate ion ($CF_3SO_3-$) and thiocyanate ion ($SCN-$) as the anion in an indol cyanine dye having a methyne chain.

12. An optical recording medium comprising a recording layer containing an organic dye, said recording layer having formed thereon, a thin film layer having an optical data recording property, wherein the organic dye contained in said recording layer is associated with an anion selected from hexafluoro-phosphate ion ($PF_6-$), trifluoromethane sulfonate ion ($CF_3SO_3-$) or thiocyanate ion ($SCN-$), as the anion in an indol cyanine dye having a methyne chain.

13. The optical data recording medium according to claim 12, wherein said organic dye has the following general formula:

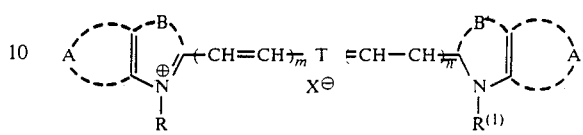

wherein ⓣ is a carbon chain or ring to form a methyne chain, composed of $-CH=CH-CH=$ or

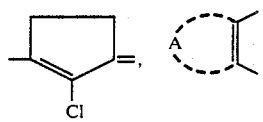

may be equal to or different from

and at least one represents a benzene ring or monochlorobenzene ring,

B may be equal to or different from B' and at least one represents

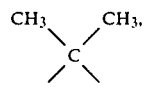

R may be equal to or different from R(1), in which each represents $CH_3$, $C_2H_5$, $C_3H_7$, $C_5H_7$, or $C_5H_{11}$, m and n each represents 0 or an integer of from 1 to 3, respectively, and have a relationship of $m+n \leq 3$, associated with an anion selected from hexafluoro-phosphate ion ($PF_6-$), trifluoromethane sulfonate ion ($CF_3SO_3-$) or thiocyanate ion ($SCN-$), as the anion in an indol cyanine dye having a methyne chain.

14. The optical data recording medium according to claim 12 or 13, wherein said thin film layer is composed of a polymer of a polymerizable monomer and a dye.

15. The optical data recording medium according to claim 14, wherein said polymerizable monomer is at least one reactive monomer selected from an acrylic monomer, styrene monomer, acrylamide monomer, fatty acid vinyl ester monomer, nitrile monomer, vinyl ether monomer, halogenated olefin monomer, conjugated diene monomer, N-vinyl compound monomer or olefinic monomer.

16. The optical data recording medium according to claim 1, wherein said anion is $SCN-$ and an infrared ray absorbing agent is mixed in said recording layer.

* * * * *